(12) United States Patent
Brandt et al.

(10) Patent No.: US 12,309,434 B2
(45) Date of Patent: May 20, 2025

(54) STREAMING PANORAMIC VIDEO OF A SCENE FROM MULTIPLE VIEWPOINTS

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Aschwin Steven Reinier Brandt, The Hague (NL); Emmanuel Thomas, Delft (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 235 days.

(21) Appl. No.: 18/029,597

(22) PCT Filed: Sep. 28, 2021

(86) PCT No.: PCT/EP2021/076598
§ 371 (c)(1),
(2) Date: Mar. 30, 2023

(87) PCT Pub. No.: WO2022/069445
PCT Pub. Date: Apr. 7, 2022

(65) Prior Publication Data
US 2024/0031614 A1 Jan. 25, 2024

(30) Foreign Application Priority Data
Oct. 1, 2020 (EP) .................................. 20199504

(51) Int. Cl.
*G06T 19/00* (2011.01)
*G06F 3/01* (2006.01)
(Continued)

(52) U.S. Cl.
CPC . *H04N 21/21805* (2013.01); *H04N 21/23439* (2013.01); *H04N 21/6587* (2013.01); *H04N 21/8456* (2013.01)

(58) Field of Classification Search
CPC ....... H04N 21/21805; H04N 21/23439; H04N 21/6587; H04N 21/8456; H04N 21/26258; H04N 21/6377
See application file for complete search history.

(56) References Cited

U.S. PATENT DOCUMENTS 9,516,225 B2 * 12/2016 Banta ................. H04N 21/4223
10,062,414 B1    8/2018 Westphal
(Continued)

FOREIGN PATENT DOCUMENTS

EP    3629585 A1    4/2020
GB    2550587 A     11/2017
(Continued)

OTHER PUBLICATIONS

Misra, K., et al., "An Overview of Tiles in HEVC," IEEE Journal of Selected Topics in Signal Processing, 7(6): 969-977 (Dec. 2013).
(Continued)

*Primary Examiner* — Howard D Brown, Jr.
(74) *Attorney, Agent, or Firm* — Hamilton, Brook, Smith & Reynolds, P.C.

(57) ABSTRACT

A streaming server and a streaming client are described, with the streaming server being configured for streaming video data representing a panoramic video of a scene to the streaming client. The panoramic video may show the scene from a viewpoint within the scene, with the viewpoint being one of a plurality of viewpoints within the scene. When streaming first video data of a first panoramic video, and when starting to stream second video data of a second panoramic video, the streaming client may at least tempo-
(Continued)

rarily and simultaneously continue to stream at least part of the first video data by continuing to stream a part of the first video data which represents shared video content of the scene which is visible in the first panoramic video and in the second panoramic video, while additionally streaming second viewpoint-specific video data which represents viewpoint-specific video content of the scene.

24 Claims, 14 Drawing Sheets

(51) Int. Cl.
*H04N 21/218* (2011.01)
*H04N 21/2343* (2011.01)
*H04N 21/6587* (2011.01)
*H04N 21/845* (2011.01)

(56) References Cited

U.S. PATENT DOCUMENTS

| | | | |
|---|---|---|---|
| 10,356,387 B1 | 7/2019 | Phillips et al. | |
| 10,419,738 B1 | 9/2019 | Phillips et al. | |
| 10,893,310 B1 | 1/2021 | Wu et al. | |
| 10,904,639 B1 | 1/2021 | Benson et al. | |
| 10,931,979 B2* | 2/2021 | Han | H04N 21/2402 |
| 11,076,162 B2 | 7/2021 | Taibi et al. | |
| 11,451,838 B2 | 9/2022 | Da et al. | |
| 11,477,470 B2* | 10/2022 | Pettersson | H04N 19/174 |
| 11,523,185 B2 | 12/2022 | Stokking et al. | |
| 11,997,338 B1 | 5/2024 | Koceski et al. | |
| 12,194,977 B2* | 1/2025 | Kato | B60T 13/662 |
| 2011/0125919 A1 | 5/2011 | Kwon et al. | |
| 2012/0036544 A1 | 2/2012 | Chen et al. | |
| 2012/0242781 A1* | 9/2012 | Gautier | H04N 21/6373 348/36 |
| 2015/0016543 A1 | 1/2015 | Rapaka et al. | |
| 2015/0026358 A1 | 1/2015 | Zhang et al. | |
| 2015/0120819 A1 | 4/2015 | Zhang et al. | |
| 2015/0264425 A1 | 9/2015 | Heinz, II et al. | |
| 2016/0165309 A1 | 6/2016 | Van et al. | |
| 2017/0013327 A1* | 1/2017 | Choi | H04N 21/47202 |
| 2017/0053675 A1 | 2/2017 | Dickerson et al. | |
| 2017/0118540 A1 | 4/2017 | Thomas et al. | |
| 2017/0155912 A1 | 6/2017 | Thomas et al. | |
| 2017/0316600 A1 | 11/2017 | Jeong et al. | |
| 2017/0332117 A1 | 11/2017 | Haritaoglu et al. | |
| 2017/0339469 A1 | 11/2017 | Trikannad | |
| 2017/0347026 A1 | 11/2017 | Hannuksela | |
| 2018/0077210 A1 | 3/2018 | Hannuksela et al. | |
| 2018/0089903 A1* | 3/2018 | Pang | H04N 23/45 |
| 2018/0097867 A1* | 4/2018 | Pang | H04N 5/2226 |
| 2018/0103199 A1 | 4/2018 | Hendry et al. | |
| 2018/0160160 A1 | 6/2018 | Swaminathan et al. | |
| 2018/0164593 A1 | 6/2018 | Van et al. | |
| 2018/0176468 A1 | 6/2018 | Wang et al. | |
| 2019/0014350 A1 | 1/2019 | Wang | |
| 2019/0088005 A1 | 3/2019 | Lucas | |
| 2019/0104316 A1 | 4/2019 | Da et al. | |
| 2019/0141311 A1 | 5/2019 | Lee et al. | |
| 2019/0141359 A1 | 5/2019 | Taquet et al. | |
| 2019/0174150 A1 | 6/2019 | D'Acunto et al. | |
| 2019/0313160 A1 | 10/2019 | Stokking et al. | |
| 2019/0325580 A1* | 10/2019 | Lukac | G06T 3/4038 |
| 2019/0373245 A1 | 12/2019 | Lee et al. | |
| 2019/0387224 A1 | 12/2019 | Phillips et al. | |
| 2020/0037043 A1 | 1/2020 | Phillips et al. | |
| 2020/0118342 A1 | 4/2020 | Varshney et al. | |
| 2020/0120326 A1 | 4/2020 | Deshpande | |
| 2020/0162766 A1* | 5/2020 | Shi | H04N 21/4728 |
| 2021/0084278 A1 | 3/2021 | Harviainen et al. | |
| 2021/0092444 A1 | 3/2021 | Ilola et al. | |
| 2021/0105313 A1 | 4/2021 | Wang et al. | |
| 2021/0385514 A1 | 12/2021 | Da et al. | |
| 2021/0400314 A1 | 12/2021 | Varekamp | |
| 2023/0026014 A1 | 1/2023 | Brandt et al. | |
| 2023/0132473 A1 | 5/2023 | Lee et al. | |
| 2025/0022212 A1 | 1/2025 | Brandt et al. | |

FOREIGN PATENT DOCUMENTS

| | | |
|---|---|---|
| WO | 2017/202899 A1 | 11/2017 |
| WO | 2018/172614 A1 | 9/2018 |
| WO | 2019/034808 A1 | 2/2019 |
| WO | 2019/043025 A1 | 3/2019 |
| WO | 2019/066191 A1 | 4/2019 |
| WO | 2019/110779 A1 | 6/2019 |
| WO | 2019195101 A1 | 10/2019 |
| WO | 2020/036384 A1 | 2/2020 |
| WO | 2021/130355 A1 | 7/2021 |
| WO | 2022/069445 A1 | 4/2022 |
| WO | 2023/099383 A1 | 6/2023 |

OTHER PUBLICATIONS

Su, T., et al., "A DASH-based HEVC multi-view video streaming system," Journal of Real-Time Image Processing, 12(2): 329-342 (Aug. 2016).
3rd Generation Partnership Project; Technical Specification Group Services and System Aspects; Virtual Reality (VR) media services over 3GPP; (Release 14), 3GPP Draft: S4-170125 TR 26.918 V0.5.0 (Jan. 2017), Jan. 27, 2017,44 pages.
Attal, B. et al., "MatryODShka: Real-time 6DoF Video View Synthesis Using Multi-sphere Images," European Conference on Computer Vision, 25 pages, Lecture Notes in Computer Science (2020).
Barnard, Dom., "Degrees of Freedom (DoF): 3-DoF vs 6-DoF for VRHeadset Selection," Retrieved from the internet URL: https://virtualspeech.com/blog/degrees-of-freedom-vr (May 5, 2019).
Begen et al, "Metrics and SAND Messages for DASH-VR," ISO/IEC JTC1/SC29/WG 11 MPEG118/m40333, Apr. 2017.
Coding of Moving Pictures and Audio, ISO/IEC JTC1/SC 29/WG 11, Technologies under Consideration for ISO/IEC DIS 23090-2 (OMAF) 2nd Ed. (Nov. 2019).
Coding of Moving Pictures and Audio, ISO/IEC JTC1/SC 29/WG 11, Text of ISO/IEC DIS 23090-5 Video-based Point Cloud Compression (Oct. 2019).
Corbillon, X. et al., "Dynamic Adaptive Streaming for Multi-Viewpoint Omnidirectional Videos," Proceedings of the 9th ACM Multimedia Systems Conference (MMSys '18), pp. 237-249 (2018).
D'Acunto et al, "MPD signalling of 360 content properties forVR applications," ISO/IEC JTC1/SC29/WG11 MPEG2016/h138605, May (2016).
GauGAN: Semantic Image Synthesis with Spatially Adaptive Normalization, Jul. 2019, ACM SIGGRAPH 2019 Real-Time Live.
Hamza A. et al., "A DASH-based Free Viewpoint Video Streaming System", Proceedings of Network and Operating System Support on Digital Audio and Video Workshop, Mar. 19, 2014, pp. 55-60.
Huang, Jingwei, et al., "6-DOF VR videos with a single 360-camera." In 2017 IEEE Virtual Reality (VR), pp. 37-44. IEEE, 2017.
Hughes, K., and Singer, D., "Draft ofFDIS ofISO/IEC 23000-19 Common Media Application Format for Segmented Media," ISO/IEC JTC1/SC29/WG1 | Coding of Moving Pictures and Audio (2017).
Information technology—Coding of audio-visual objects—Part 19: Common media application format (CMAF) for segmented media, The Third Edition of 23009-1. (2018).
Information technology—MPEG systems technologies—Part 10: Carriage of Timed Metadata Metrics of Media in ISO Base Media File Format (2015).
International Standard, "Information technology—Dynamic adaptive streaming over HTTP (DASH)," Part 5: Server and network assisted DASH (SAND), ISO/IEC 23009-5, First edition (Feb. 2017).

(56) References Cited

OTHER PUBLICATIONS

International Standard, Information technology—Coded representation of immersive media—Part 2: Omnidirectional media format ISO/IEC 23090-2, First Edition (Jan. 2019).

International Standard, Information technology—Dynamic Adaptive Streaming Over HTTP (DASH)—Part 1: Media Presentation Description and Segment Formals ISO/IEC 23090-1, Third Edition (2019-08).

Krishnamoorthi, V., et al., "Empowering the Creative User: Personalized HTTP-Based Adaptive Streaming of Multi-Path Nonlinear Idea." In Proceedings of the 2013 ACM SIGCOMM workshop on Future human-centric multimedia networking, pp. 53-58 (2013).

Pantos, R., et al., "HTTP Live Streaming," Retrieved from the internet URL: https://tools.ietf.org/html/rfc8216 (Aug. 2017).

Roberto Lopez-Gulliver, et al, "Synthesis of Omnidirectional Movie using a Set of Key Frame Panoramic Images" IEEE, Virtual Reality Conference (2015).

Song, Seulki, et al., "Free-Viewpoint Relationship Description Based Streaming Systems for Arbitrary View Switching." 2018 Tenth International Conference on Ubiquitous and Future Networks (ICUFN) (2018): 738-740.

Wikipedia contributors, "Content delivery network," Wikipedia, The Free Encyclopedia, https://en.wikipedia.org/w/index.php?title=Content_delivery_network&oldid=922913646 (accessed Oct. 29, 2019).

Wikipedia contributors, "Euler angles," Wikipedia, The Free Encyclopedia, https://en.wikipedia.org/w/index.php?title=Euler_angles&oldid=920247849 (accessed Oct. 29, 2019).

Wikipedia contributors, "NAT traversal," Wikipedia, The Free Encyclopedia, https://en.wikipedia.org/w/index.php?title=NAT_traversal&oldid=90241 0582 (accessed Oct. 29, 2019).

Yamamoto, T. et a., "Analysis on MPEG-I Architectures", 125 Mpeg Meeting; Jan. 14, 2019-Jan. 18, 2019; Marrakech; (Motion Picture Expert Group or ISO/IEC JTC1/SC29/WG11), No. M45929, Jan. 13, 2019, XP030214334.

Zhao, Mincheng, et al., "A cloud-assisted DASH-based scalable interactive multiview video streaming framework." In 2015 Picture Coding Symposium (PCS), pp. 221-226. IEEE, 2015.

Ostermann, "Potential improvement for OMAF," Coding of Moving Pictures and Audio, ISO/IEC JTC1/SC29/WG11, N19435, (Jul. 30, 2020).

Li, Ming Jing, et al., "Multipleviews of regions of interest," ISO/IEC JTC1/SC29/WG11, MPEG2013/m31167 (Oct. 2013).

Thomas, Emmanuel, et al., "On source content in OMAF," ISO/IEC JTC1/SC29/WG11, MPEG2016/m41440 (Oct. 2017).

Corbilloln, X., et al., "Dynamic adaptive streaming for multi-viewpoint omnidirectional videos," MMSys '18: Proceedings of the 9th ACM Multimedia Systems Conference, 237-249 (Jun. 2018).

International Search Report and Written Opinion for PCT/EP2021/076598, dated: Dec. 23, 2021.

\* cited by examiner

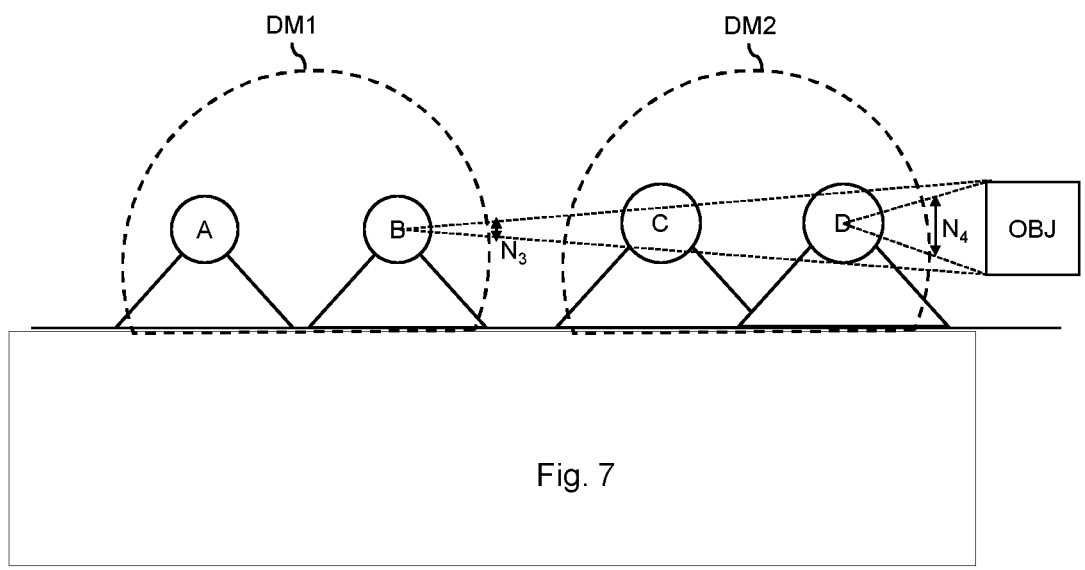

STREAMING PANORAMIC VIDEO OF A SCENE FROM MULTIPLE VIEWPOINTS

This application is the U.S. National Stage of International Application No. PCT/EP2021/076598, filed Sep. 28, 2021, which designates the U.S., published in English, and claims priority under 35 U.S.C. § 119 or 365 (c) to European Application No. 20199504.0, filed Oct. 1, 2020. The entire teachings of the above applications are incorporated herein by reference.

TECHNICAL FIELD

The invention relates to a streaming server for, and to a computer-implemented method of, streaming video data to a streaming client, wherein the video data represents a panoramic video of a scene. The invention further relates to a streaming client for, and to a computer-implemented method of, receiving the video data representing the panoramic video of the scene. The invention further relates to an authoring system for, and to a computer-implemented method of, authoring one or more video streams representing a panoramic video of a scene. The invention further relates to a computer-readable medium comprising data representing a computer program, and to a computer-readable medium comprising metadata.

BACKGROUND

It is known to capture a panoramic video of a scene and to display the panoramic video to a user. Here, the adjective 'panoramic' may refer to the video providing an immersive experience when displayed to the user. In general, one may consider a video to be 'panoramic' if it provides a wider field of view than that of the human eye (being about 160° horizontally by vertically). A panoramic video may even provide a larger view of the scene, e.g., a full 360 degrees, thereby providing an even more immersive experience to the user. Such panoramic videos may be acquired of a real-life scene by a camera, such as a 180° or 360° camera, or may be synthetically generated ('3D rendered') as so-called Computer-Generated Imagery (CGI). Panoramic videos are also known as (semi-)spherical videos. Videos which provide at least an 180° horizontal and/or 180° vertical view are also known as 'omnidirectional' videos. An omnidirectional video is thus a type of panoramic video.

In general, panoramic videos may be two-dimensional (2D) videos but may also be three-dimensional (3D) videos, e.g., stereoscopic or volumetric videos.

Panoramic videos may be displayed in various ways, for example using various types of displays, such as Head-Mounted Displays (HMD), holographic displays and curved or other types of displays providing an immersive experience to the user, including but not limited to large-screen or multi-screen displays such as CAVE or IMAX cinema displays. Panoramic videos may also be rendered in a virtual environment by means of Virtual Reality (VR) or Augmented Reality (AR) technology. Panoramic videos may also be displayed using displays which are normally not known to provide an immersive experience, e.g., on a display of a mobile device or on a computer monitor. In such examples, a user may still obtain a degree of immersion by being able to look around in the panoramic video, e.g., by controlling the position of a viewport through which a part of the panoramic video is viewed on a display.

It is known to acquire different panoramic videos of a scene. For example, different panoramic videos may be captured at different spatial positions within the scene. Each spatial position may thus represent a different viewpoint within the scene. An example of a scene is an interior of a building, or an outdoor location such as a beach or a park. A scene may also be comprised of several locations, e.g., different rooms and/or different buildings, or a combination of interior and exterior locations.

It is known to enable a user to select between the display of the different viewpoints. Such selection of different viewpoints may effectively allow the user to 'teleport' through the scene. If the viewpoints are spatially in sufficient proximity, and/or if a transition is rendered between the different viewpoints, such teleportation may convey the user with a sense of near-continuous motion through the scene.

Such panoramic videos may be streamed to a streaming client in the form of respective video streams. It is a concern how to enable seamless or at least fast switching between video streams presenting the different viewpoints, so that the experience of the user is not, or at least not significantly interrupted during switching.

Corbillion et al. [1] describes a multi-viewpoint (MVP) 360-degree video streaming system, where a scene is simultaneously captured by multiple omnidirectional video cameras. The user can only switch positions to predefined viewpoints (VPs). The video streams may be encoded and streamed using MPEG Dynamic Adaptive Streaming over HTTP (DASH), in which multiple representations of the same content may be available at different bitrates and resolutions. The video streams may further be encoded and streamed as Motion-Constrained Tile Sets (MCTS) [2], in which a rectangular video may be spatially split into rectangular, independently decodable, non-overlapping regions, i.e., the so-called 'tiles'.

Corbillion et al. further describes that a next translation movement of a user may be predicted so that a client can decide to request representations in the current viewpoint if the client does not anticipate any move in the near future or in another viewpoint if the client anticipates a move soon. It is further described that a next head orientation rotation of a user may be predicted so that the client can request tiles in various predicted locations of the frame in the given viewpoint.

Corbillion et al. thereby addresses the problem of how to enable seamless switching between the different viewpoints by having the client predict the movement of the user in the scene and to already stream the predicted viewpoints. Since this may require a very large bandwidth, a client may combine MPEG-DASH with only streaming certain tiles so as to only stream those tiles which the user is currently looking at or predicted to look at in the current viewpoint or in an adjacent viewpoint.

A disadvantage of Corbillion et al. is that the bandwidth requirements for a streaming client, and conversely for a streaming server, may still be too high. This may be disadvantageous for the streaming, and in some cases for the encoding, decoding and/or storing of the video data associated with the viewpoints of the scene.

REFERENCES

[1] Xavier Corbillon, Francesca De Simone, Gwendal Simon, and Pascal Frossard. 2018. *Dynamic adaptive streaming for multi-viewpoint omnidirectional videos*. In Proceedings of the 9th ACM Multimedia Systems Conference (MMSys '18). Association for Computing Machinery, New York, NY, USA, 237-249.

[2] K. Misra, A. Segall, M. Horowitz, S. Xu, A. Fuldseth, and M. Zhou. *An Overview of Tiles in HEVC*. IEEE Journal of Selected Topics in Signal Processing, 7(6):969-977, December 2013.

SUMMARY

It may be desirable to further reduce, or have an additional way of reducing the bandwidth requirements when streaming multi-viewpoint video, while continuing to enable seamless or at least fast switching between the different viewpoints.

In a first aspect of the invention, a computer-implemented method may be provided for streaming video data to a streaming client. The video data may represent a panoramic video of a scene. The panoramic video may show the scene from a viewpoint within the scene. The viewpoint may be one of a plurality of viewpoints within the scene. The method may comprise, by a streaming server:

streaming first video data which may represent a first panoramic video from a first viewpoint within the scene to the streaming client;

in response to a decision to stream second video data representing a second panoramic video from a second viewpoint within the scene, streaming the second video data to the streaming client by, in at least one operational mode of the streaming server, at least temporarily and simultaneously:

continuing to stream at least part of the first video data by continuing to stream shared video data which may represent shared video content of the scene, wherein the shared video content may comprise video content of the scene which may be visible in the first panoramic video and in the second panoramic video; and streaming second viewpoint-specific video data which may represent second viewpoint-specific video content of the scene, wherein the second viewpoint-specific video content may comprise video content of the scene which may be part of the second panoramic video and not part of the shared video content of the scene.

In a further of aspect of the invention, a streaming server may be provided for streaming the video data to a streaming client. The streaming server may comprise:

a network interface to a network, wherein the streaming client may be reachable by data communication via the network;

a processor subsystem which may be configured to, via the network interface:

stream first video data which may represent a first panoramic video from a first viewpoint within the scene to the streaming client;

in response to a decision to stream second video data representing a second panoramic video from a second viewpoint within the scene, stream the second video data to the streaming client by at least temporarily and simultaneously:

continuing to stream at least part of the first video data by continuing to stream shared video data which may represent shared video content of the scene, wherein the shared video content may comprise video content of the scene which may be visible in the first panoramic video and in the second panoramic video; and streaming second viewpoint-specific video data which may represent second viewpoint-specific video content of the scene, wherein the second viewpoint-specific video content may comprise video content of the scene which may be part of the second panoramic video and not part of the shared video content of the scene.

In a further of aspect of the invention, a computer-implemented method may be provided for receiving the video data. The method may comprise, by a streaming client:

receiving, by streaming, first video data which may represent a first panoramic video from a first viewpoint within the scene;

when switching to a second viewpoint, receiving, by streaming, second video data of a second panoramic video from the second viewpoint within the scene;

wherein the receiving, by streaming, of the second video data may comprise, in at least one operational mode of the streaming client, at least temporarily and simultaneously:

continuing to receive, by streaming, at least part of the first video data by continuing to receive shared video data which may represent shared video content of the scene, wherein the shared video content may comprise video content of the scene which may be visible in the first panoramic video and in the second panoramic video, receiving, by streaming, second viewpoint-specific video data which may represent second viewpoint-specific video content of the scene, wherein the second viewpoint-specific video content may comprise video content of the scene which may be part of the second panoramic video and not part of the shared video content of the scene.

In a further aspect of the invention, a streaming client may be provided for receiving the video data by streaming. The streaming client may comprise:

a network interface to a network;

a processor subsystem which may be configured to, via the network interface:

receive, by streaming, first video data which may represent a first panoramic video from a first viewpoint within the scene;

when switching to a second viewpoint, receive, by streaming, second video data of a second panoramic video from the second viewpoint within the scene, wherein the receiving, by streaming, of the second video data may comprise at least temporarily and simultaneously:

continuing to receive, by streaming, at least part of the first video data by continuing to receive shared video data which may represent shared video content of the scene, wherein the shared video content may comprise video content of the scene which may be visible in the first panoramic video and in the second panoramic video, receiving, by streaming, second viewpoint-specific video data which may represent second viewpoint-specific video content of the scene, wherein the second viewpoint-specific video content may comprise video content of the scene which may be part of the second panoramic video and not part of the shared video content of the scene.

The above measures may involve making the video data of a plurality of viewpoints within a scene available for streaming from a streaming server to a streaming client. The streaming server may for example be one or a combination of content delivery nodes (CDN), and the streaming client may for example be a network node, such as an edge node of a mobile or fixed-line network, or an end-user device, such as a mobile device, a computer, a VR/AR device, etc.

By way of the above measures, video data representing a first panoramic video may be streamed from the streaming server to the streaming client. The first panoramic video may show the scene from a first viewpoint within the scene. The video data may elsewhere also be referred to as 'first' video data to denote that it represents the 'first' panoramic video from the 'first' viewpoint. Elsewhere, numerical adjectives such as 'second', 'third', etc. may identify other viewpoints and corresponding panoramic videos and video data, but without implying limitations which are otherwise not described.

The first video data may be streamed from the streaming server to the streaming client at a given moment in time, for example by the streaming client having previously requested the streaming of the first video data. It may at a later moment in time be desired to switch to a second viewpoint within the scene. For example, the user may have selected the second viewpoint, for example by operating a user input device of the end-user device, or the second viewpoint may have been selected automatically, e.g., by the streaming client using a prediction technique to predict that the user may soon select the second viewpoint. Accordingly, the streaming client may decide to have second video data streamed which represents a second panoramic video from a second viewpoint within the scene, and the streaming server may receive a corresponding request for streaming from the streaming client. Alternatively, another entity may decide that the streaming server is to stream the second panoramic video to the streaming client, such as the streaming server itself or an entity orchestrating the streaming session. In general, in response to such a decision, the second video data may then be streamed to the streaming client. This may involve at least temporarily and simultaneously continuing to stream at least part of the first video data, while additionally streaming video data specifically associated with the second viewpoint. The part of the first video data which may be continued to be streamed may be referred to as 'shared' video data while the additionally streamed video data may be referred to as 'second viewpoint-specific video data', as will be explained in the following.

The inventors have recognized that there may be redundancy between the panoramic videos of a same scene. Namely, at least part of the video content which is shown in a panoramic video may also be shown in a panoramic video of an adjacent viewpoint. A reason for this is that the video content may represent objects or parts of the scene which are visible from both viewpoints. A specific example is a part of the sky in an outdoor scene; while moving between viewpoints, large portions of the sky may remain visible in the viewpoints along the way. The inventors have recognized that, in general, there may be parts of the scene which may be occluded and de-occluded when transitioning between different viewpoints, but that part of the scene may remain visible and may only shift or change in size between viewpoints. In particular, if the spatial distance between viewpoints in the scene is relatively small compared to the distance of the camera acquiring the scene to these parts of the scene, such shifts and changes in size may be (very) limited, meaning that potentially large parts of the scene may only minorly shift or change in size while transitioning between viewpoints.

There may thus be redundancy between panoramic videos. Conversely, this may mean that in the approach of Corbillion et al. [1], where adjacent viewpoint(s) may already be streamed to a streaming client if it is expected that the user may move to the adjacent viewpoint, several video streams may be streamed simultaneously to the streaming client which may comprise redundant video content. This may mean that the bandwidth requirements may be unnecessarily high, even when combined with tiled streaming where only a subset of the tiles of a panoramic video may be streamed.

It is in principle known to exploit redundancy between videos. For example, Su et al. [3] propose to use a HEVC Multiview extension (MV-HEVC) to encode texture and depth information redundantly between the different viewpoints. However, Su et al. propose to group all the viewpoints into a single encoded bitstream comprising different layers where each layer is a viewpoint and the viewpoints have coding dependencies. This, however, may not be suitable for streaming scenarios but rather for local file playback, since the bandwidth required for streaming the single encoded bitstream may be very high, particularly in cases where there are many different viewpoints. This may not only be disadvantageous for the streaming, but also for the encoding, decoding and/or storing of the video data associated with the viewpoints of the scene.

The inventors have further recognized that at least part of the first video data may be effectively 'reused' to reconstruct the second panoramic video at the streaming client, at least on a temporary basis. Namely, video content of the scene which is visible in the first panoramic video and in the second panoramic video may, when switching to the second viewpoint, still be obtained from the first video data. However, the second panoramic video cannot be entirely reconstructed from the first video data due to the aforementioned occlusion or de-occlusion between viewpoints. Accordingly, the above measures may make viewpoint-specific video data available for streaming which may contain the viewpoint-specific video content of the scene, being in this case the video content which is visible in the second panoramic video and not part of the shared video content between both viewpoints, e.g., by not being visible or by being insufficiently visible in the first panoramic video. This may mean that when switching to the second viewpoint, it may suffice to additionally stream second viewpoint-specific video data which represents the viewpoint-specific video content for this viewpoint, or at least that it may not be needed for the streaming server to immediately and integrally stream the second panoramic video when the second panoramic video is requested or when it is otherwise decided to stream said video.

Effectively, the second video data may at least temporarily be constituted by a part of the first video data and the additionally streamed viewpoint-specific video data, and may thus not represent an integral encoding of the second panoramic video.

This may have various advantages. For example, if the request for the second viewpoint is a prefetching request, e.g., in anticipation of the selection of the second viewpoint by the user, it may not be needed to simultaneously stream all of the first and second panoramic videos, but it may rather suffice to simultaneously stream the first panoramic video and the viewpoint-specific part of the second panoramic video. Similar to the request that may be a prefetching request, the selection of the second viewpoint may be a preselection by the streaming client in anticipation of the selection of the second viewpoint by the user. This may be advantageous if several panoramic videos, or tiles of such videos, are already simultaneously streamed in anticipation of the user selecting one of the corresponding viewpoints. Here, the reduction in bandwidth may be sizable compared to streaming each panoramic video as an integral and independent video stream.

Even if the request is sent only after the selection of the second viewpoint by the user, there may be other advantages. For example, the switching to the second viewpoint may be faster. Namely, the second viewpoint-specific video content may be limited in terms of data size, in that it may only represent a part, but not all, of the second panoramic video. This means that shorter segments may be chosen for the encoding while still achieving a given bandwidth for a particular panoramic video. Such shorter segments may correspond to there being more densely spaced random-access points, and may correspond to a shorter GOP size. This may mean that after the selection of the second viewpoint, the streaming client may switch more quickly to the second viewpoint by being able to decode the second viewpoint-specific video data from any upcoming random-access point onwards. Conversely, since the shared video content may be reused between several viewpoints and may thus on average be less frequently started and stopped during a streaming session, longer segments may be chosen for the encoding (corresponding to there being less densely spaced random-access points, corresponding to a longer GOP size) to improve coding efficiency and to compensate for the shorter segments of the viewpoint-specific video content.

Various other advantages are conceived. For example, the shared video data may only be encoded and/or stored once for two or more viewpoints. This may reduce the computational complexity of encoding and/or the storage requirements.

It will be appreciated that the first video data may already be streamed in a same or similar way as the second video data, in that it may comprise at least two distinct and individually identifiable parts, namely a shared part which contains video content which is shared with other viewpoints and a viewpoint-specific part which contains the viewpoint-specific video content. As such, the advantages which are described above for at least temporarily streaming the second video data in the above described manner may also apply to the streaming of the first video data, or at least temporarily if the first video data is only temporary streamed this way, and likewise to the streaming of the video data of any viewpoint and the switching between viewpoints.

It will be appreciated that the switching to a second panoramic video by reusing video data of a first panoramic video may be functionality which is provided in a particular operational mode of the streaming client and/or the streaming server. In other words, it may not be needed to always switch viewpoints in the described manner, but rather, such switching may be a selectable operational mode of either entity.

In general, the measures described in this specification may be applied within the context of rendering a scene in Virtual Reality (VR), Augmented Reality (AR), Mixed Reality (MR), with all three techniques also being called Extended Reality (XR).

The following embodiments may relate to the method of streaming video data and to the streaming server. It will be appreciated, however, that any embodiment which defines how or what type of data is sent to the streaming client is reflected by an embodiment by which the streaming client is configured for, and a corresponding method is provided for, receiving, decoding and/or rendering this type of data.

In an embodiment of the method of streaming video data, the streaming of the first video data may comprise streaming first viewpoint-specific video data which represents first viewpoint-specific video content of the scene, wherein the first viewpoint-specific video content comprises video content of the scene which may be part of the first panoramic video and not part of the shared video content of the scene, and streaming a shared video stream comprising the shared video data; the streaming of the second video data may comprise at least temporarily continuing to stream the shared video stream.

In a corresponding embodiment, the processor subsystem of the streaming server may be configured to perform the streaming in the above-mentioned manner.

In accordance with these embodiments, the first video data may be streamed as at least two separate video streams, namely a shared video stream comprising the shared video data and a viewpoint-specific video stream comprising the viewpoint-specific video data of the respective panoramic video, with at least the former being temporarily continued when streaming the second video data. In some embodiments, where the first video data and the second video data are simultaneously streamed, for example when anticipating a selection of the second viewpoint by the user, the first video data and the second video data may be streamed in the form of the shared video stream, a first viewpoint-specific video stream and a second-viewpoint-specific video stream. Compared to the streaming of two video streams which each integrally represent the respective panoramic videos, the aforementioned streaming may require less bandwidth. In addition, the streaming of the first viewpoint-specific video stream may simply be stopped independently of the shared video stream, for example in response to a user actually selecting the second viewpoint for display.

In general, a plurality of panoramic videos may be represented by one or more shared video streams which contain shared video data which is shared amongst different ones of the panoramic videos, and by a viewpoint-specific video stream for each of the plurality of panoramic videos. In general, different encoding properties may be used for a shared video stream than for a viewpoint-specific video stream. For example, a viewpoint-specific video stream may be encoded to have more random-access points compared to a shared video streams, a different encoding quality, etc.

In an embodiment of the method of streaming video data, the streaming of the first video data may comprise streaming a video stream in which the shared video data is included as an independently decodable part.

In a corresponding embodiment, the processor subsystem of the streaming server may be configured to perform the streaming in the above-mentioned manner.

In accordance with these embodiments, the shared video data may be an independently decodable part of a first video stream. For example, the shared video data may be represented by one or more tiles of a tile-based video stream. This may allow the streaming client to, when switching to a second video stream, cease decoding other parts of the first video stream besides the shared video data. As such, the computational complexity of decoding may be reduced, compared to a case where the shared video data is part of a video stream which does not allow independent decoding and which otherwise would have to be fully decoded by the streaming client to obtain the shared video content needed to reconstruct the second panoramic video. In some embodiments, the streaming client may also cease receiving the parts of the video data which are not needed to reconstruct the second panoramic video.

In an embodiment of the method of streaming video data, the method may comprise providing metadata to the streaming client, wherein the metadata may be indicative of the shared video data representing part of the first video data and part of the second video data. In a corresponding embodiment, the processor subsystem of the streaming server may be configured to provide metadata as described above.

In an embodiment of the method of receiving video data, the method may further comprise receiving metadata, wherein the metadata may be indicative of the shared video data representing part of the first video data and part of the second video data, and on the basis of the metadata, using the shared video data for the rendering of the second panoramic video. In a corresponding embodiment, the processor subsystem of the streaming client may be configured to receive and use the metadata in the above-mentioned manner.

In accordance with these embodiments, the streaming client may be signaled that the shared video data, which may at a given moment be received as part of the video data of a first panoramic video, may also represent part of the video data of a second panoramic video. Such signaling may be effected by the streaming server providing metadata to the streaming client, e.g., as part of the video data of a respective panoramic video, or as part of general metadata of a streaming session. For example, the shared video data may be identified as being 'shared' amongst different panoramic videos in a so-called manifest associated with the streaming session.

In an embodiment of the method of streaming video data, the method may further comprise streaming the shared video data or any viewpoint-specific video data as a spatially segmented encoding of at least part of a panoramic video.

In a corresponding embodiment, the processor subsystem of the streaming server may be configured to perform the streaming in the above-mentioned manner.

It is known to use a spatially segmented encoding, e.g., as described by [2], to be able to stream specific parts of a panoramic video to a streaming client instead of having to stream all of the panoramic video concurrently. Namely, such spatial segments may be individually streamed and decoded by the streaming client. This may allow a streaming client to retrieve only those segments which are currently displayed or which are predicted to have a reasonable likelihood of being displayed in the near future, e.g., as in [1]. This may reduce the concurrent bandwidth to the streaming client or other receiving entity, and the computational complexity of decoding at the receiving entity. The techniques described in this specification for making shared video data available may be combined with spatially segmented encoding techniques. For example, the shared video content may be encoded as one or more independently decodable spatial segments, for example of a video stream of a panoramic video or as a separate 'shared' video stream. In some embodiments, this may avoid the need to stream all of the shared video data if some of the shared video content is currently not displayed or not expected to be displayed. In some embodiments, this may enable the streaming client to continue receiving and decoding the shared video data by continuing to receive and decode one or more spatial segments of a first panoramic video, while ceasing to receive and decode one or more other spatial segments of the first panoramic video. In some embodiments, the spatial position and/or orientation of the shared video content with respect to the panoramic video may be identified using metadata associated with the spatially segmented encoding, including but not limited to the so-called spatial representation description (SRD) metadata of MPEG-DASH.

In an embodiment of the method of streaming video data, the streaming of the shared video data may comprise periodically transmitting at least one of:

an image; and
metadata defining a color for filling a spatial region,
wherein the image or the color represent at least part of the shared video content for at least a plurality of video frames.

In a corresponding embodiment, the processor subsystem of the streaming server may be configured to perform the streaming in the above-mentioned manner.

The shared video data may in many cases represent a 'background' of a scene, in that it may represent parts of the scene which are further away compared to other objects which may be a 'foreground' of the scene. Such a background may be relatively static, in that it may not change in appearance, or only to a limited degree. For example, the sky or an exterior of a building may remain relatively static over a number of video frames of a panoramic video. The same may also apply to video data which is not necessarily a 'background' of the scene, in that also such non-background type of video data may remain relatively static over a number of video frames of a panoramic video. To improve coding efficiency, and thereby reduce the bandwidth to the streaming client and the computational complexity of decoding, the shared video data may be streamed by periodically transmitting images representing the shared video content. This may effectively correspond to a temporal subsampling of the shared video data, in that only the shared video content in every $2^{nd}$, $10^{th}$, $50^{th}$, etc. video frame may be transmitted to the streaming client. Such periodic streaming may also be adaptive, in that an image may be transmitted if changes in the shared video content exceed a static or adaptive threshold. The term 'periodic transmitting' thus includes the time between the transmission of images being variable in length. The images may directly represent the shared video content, or may contain a texture which represents the shared video content when tiled in a certain spatial region. In some embodiments, where the shared video content is homogenous, e.g., as in the case of a cloud-free sky, the shared video content may take the form of metadata defining a color for filling a spatial region corresponding to the shared video content. It is also conceived to combine the transmission of images and metadata defining a fill-color.

The following embodiments may relate to the method of receiving video data and to the streaming client. It will be appreciated, however, that any embodiment which defines how or what type of data is received by the streaming client is reflected by an embodiment in which the streaming server is configured for, and a corresponding method is provided for, streaming and/or generating this type of data.

In an embodiment, the metadata may further identify a second viewpoint-specific video stream containing the second viewpoint-specific video data, wherein the second viewpoint-specific video stream may be accessible from a streaming server. In the embodiment, the method of receiving video data may further comprise, on the basis of the metadata and when switching to the second viewpoint, requesting the second viewpoint-specific video stream from the streaming server.

In a corresponding embodiment, the processor subsystem of the streaming client may be configured to receive and use the metadata in the above-mentioned manner.

In accordance with these embodiments, the second viewpoint-specific video data may be made available to the streaming client as a separate video stream which may be identified to the streaming client by way of metadata. This may allow the streaming client to request the second viewpoint-specific video stream when the second viewpoint is selected, e.g., by the user or automatically by the streaming client, e.g., for caching purposes. This may enable the streaming client to additionally retrieve only those parts of the second panoramic video which are not yet available to the streaming client, e.g., the second viewpoint-specific part, and thereby avoid unnecessary bandwidth and decoding complexity which may otherwise be required when the second panoramic video is only integrally available for streaming.

In an embodiment, the metadata may be a manifest for the streaming of the video data of the scene. For example, the streaming server may provide a Media Presentation Description (MPD) to the streaming client, this being an example of a so-called manifest or manifest file. The MPD may list and thereby identify different video streams, and in some embodiments, different versions ('representations') of a video stream, for example each having a different spatial resolution and/or bitrate. The client may then select a version of the video stream by a selection from the MPD. As such, any shared video data and/or any viewpoint-specific video data may be identified in the manifest, e.g., as a separate video stream having one or more representations.

In an embodiment, the metadata may be indicative of a transformation to be applied to the shared video content. In the embodiment, the method of receiving video data may further comprise applying the transformation to the shared video content before or as part of the rendering of the second panoramic video.

In a corresponding embodiment, the processor subsystem of the streaming client may be configured to use the metadata in the above-mentioned manner.

While the object(s) representing the shared video content may be visible from two different viewpoints, the object(s) may have a different relative position and/or orientation with respect to the real or virtual camera of each viewpoint. For example, if the shared video content represents an exterior of a building, one of the viewpoints may be nearer to the building or positioned at a same distance but sideways of the other viewpoint. The appearance of the object(s) representing the shared video content may thus change between viewpoints and thus between panoramic videos. To enable the shared video content to be used for the reconstruction of different panoramic videos, the metadata may be indicative of a transformation to be applied to the shared video content. In some embodiments, the transformation defined in the metadata may be specific for the reconstruction of a specific panoramic video. In general, the transformation may compensate for changes in appearance of the object(s) between viewpoints and thus between panoramic videos. For example, the transformation may parameterize the change in appearance as an affine transformation or a higher-order image transformation. This may allow the shared video content to be (re)used for the reconstruction of different panoramic videos despite such changes in appearance.

In an embodiment, locations of the viewpoints may be representable as respective coordinates in a coordinate system associated with the scene, wherein the metadata defines a range of coordinates for the shared video data. In the embodiment, the method of receiving video data may further comprise using the shared video data for the rendering of respective panoramic videos of viewpoints of which the respective coordinates lie in the range of coordinates defined by the metadata.

In a corresponding embodiment, the processor subsystem of the streaming client may be configured to use the metadata in the above-mentioned manner.

The shared video content may be usable for the reconstruction of a number of panoramic videos. This may be indicated to the streaming client in various ways, for example using the aforementioned manifest. Additionally, or alternatively, if viewpoints are representable as respective coordinates in a coordinate system associated with the scene, e.g., as geolocation coordinates or as XY coordinates having no specific geographical meaning, a range of coordinates may be communicated to the streaming client. The streaming client may then determine whether (and in some embodiments, which) shared video data is to be used for the reconstruction of a particular panoramic video, for example by comparing the coordinate of the viewpoint of the panoramic video to the range of coordinates. This may allow the shared video content to be associated with a plurality of panoramic videos in a manner which has a physical analogy. This manner is easy to understand, since an object is typically visible from several viewpoints within a particular range of coordinates. In particular, this may allow the shared video data to be associated with viewpoints which are not known to the streaming server, e.g., in case the streaming client is able to reconstruct intermediate viewpoints by interpolation between panoramic videos of nearby viewpoints.

In an embodiment, the shared video data which is at least temporarily received is a first version of the shared video content which is derived from the first panoramic video. In the embodiment, the method of receiving video data may further comprise receiving, by streaming, second shared video data which represents a second version of the shared video content which is derived from the second panoramic video.

In a corresponding embodiment, the processor subsystem of the streaming client may be configured to receive video data in the above-mentioned manner.

The shared video data which is previously received for the first viewpoint may be temporarily used for the rendering of the second panoramic video, but may after some time be replaced by a second version of the shared video content which is derived from the second panoramic video. This may have various advantages. For example, while the shared video content from the first viewpoint may suffice for the rendering of the second panoramic video, there may be slight differences in appearance between the object(s) representing the shared video content between the first viewpoint and the second viewpoint. For example, the object(s) may be nearer to the real or virtual camera of the second viewpoint, which may allow more details to be resolved. As another example, in some embodiments, the first version of the shared video content may require a transformation for rendering as part of the second panoramic video, whereas the second version of the shared video content may be rendered as part of the second panoramic video without the use of a transformation. By switching to the second version of the shared video content, the shared video content may be shown in the way as it is visible from the second viewpoint. Nevertheless, compared to immediately requesting, receiving and switching to the second version of the shared video content, the temporarily continuing to stream the first version of the shared video content may be advantageous, for example in case random-access points in the shared video data are less frequent per time unit while random-access points in the viewpoint-specific video data are more frequent. Namely, it may not be needed to await a random-access point in the second version of the shared video content before starting to render the second panoramic video, but rather, the first version may be at least temporarily (re)used for said rendering.

In an embodiment, the second version of the shared video content may be received as a video stream, and the receiving of the video stream may start at a stream access point in the video stream. A stream access point, which may also be referred to as random-access point elsewhere, may allow the streaming client to switch to the second version of the shared video content. For example, the random-access points in the shared video data may be less frequent per time unit than in the viewpoint-specific video data, which means that the first version of the shared video content may be continued to be streamed until a stream access point in the second version of the shared video content is available, at which time the second version may be used.

In an embodiment, the video stream containing the second version of the shared video content may be a second shared video stream, wherein the second viewpoint-specific video data may be received as a second viewpoint-specific video stream, and wherein the second shared video stream comprises, per time unit, fewer stream access points than the second viewpoint-specific video stream.

In a corresponding embodiment, the processor subsystem of the streaming client may be configured to receive video data in the above-mentioned manner.

In an embodiment of the method of receiving video data, the method may further comprise combining the shared video content with the second viewpoint-specific video content by at least one of:
 spatially adjoining the shared video content with the second viewpoint-specific video content;
 merging the shared video content with the second viewpoint-specific video content; and
 overlaying the second viewpoint-specific video content over the shared video content.

In a corresponding embodiment, the processor subsystem of the streaming client may be configured to perform the combining in the above-mentioned manner.

The shared video content may be formatted so that the streaming client or other receiving entity is enabled to combine the shared video content with the viewpoint-specific video content in a particular manner. This manner of combining may be predetermined, e.g., standardized, but may in some embodiments also be signaled to the receiving entity, e.g., by the streaming server including metadata with the video data of the panoramic video. By combining both types of video content, the receiving entity may effectively reconstruct the respective panoramic video, or at least part thereof. For example, if the shared video content is spatially disjunct from the viewpoint-specific video content, the shared video content may be adjoined to the viewpoint-specific video content. This example relates to the fact that the shared video content and the viewpoint-specific video content may represent spatially disjunct parts of the panoramic video. Both types of video content may also be combined by overlaying one type of video content over the other, or by merging both types of video content in any other manner. The different types of combining may also be used together. For example, if the shared video content is partly spatially disjunct but overlaps at its borders with the viewpoint-specific video content, a blending technique may be used to combine the overlapping parts of both types of video content.

In an embodiment of the method of receiving video data, the method may further comprise rendering the second video data to obtain rendered video data for display by the streaming client or another entity, wherein the rendering may comprise combining the shared video data and the second viewpoint-specific video data.

In a corresponding embodiment, the processor subsystem of the streaming client may be configured to render video data in the above-mentioned manner.

The rendering may represent any known rendering of a panoramic video, and may for example comprise steps such as applying an inverse equirectangular projection to the received video data in case said video data contains spherical video content which is converted into a rectangular image format using an equirectangular projection. In general, the rendering may comprise rendering the panoramic video only within a viewport, e.g., as currently displayed to a user. The rendering may for example be performed by an end-user device, or by an edge node as the streaming client. In the former case, the rendered video data may then be displayed by the streaming client, while in the latter case, the rendered video data may again be transmitted to a further streaming client, namely to the end-user device, where it may be displayed.

In a further aspect of the invention, a streaming client may be provided for receiving video data by streaming, wherein video data may represent a panoramic video of a scene, wherein the panoramic video may show the scene from a viewpoint within the scene, wherein the viewpoint may be one of a plurality of viewpoints within the scene. The streaming client may comprise:
 a network interface to a network;
 a processor subsystem which may be configured to, via the network interface:
 receive, by streaming, first video data which may represent at least part of a first panoramic video from a first viewpoint within the scene;
 receive, by streaming, further video data of the scene;
 receive metadata indicative of the further video data being shared video data representing shared video content of the scene, wherein the shared video content may comprise video content of the scene which may be visible in the first panoramic video and in a second panoramic video from a second viewpoint within the scene;
 based on the metadata, combine the first video data with the shared video data to obtain combined video data for rendering the first panoramic video.

The first video data may for example comprise viewpoint-specific video data of the first panoramic video which may be combined with the shared video data in a manner described elsewhere in this specification. The shared video data may for example comprise a version of the shared video content derived from the second panoramic video. In a specific yet non-limiting example, the streaming client may switch from rendering the second panoramic video to rendering first panoramic video and may continue to stream the shared video data derived from the second panoramic video while starting to stream the viewpoint-specific video data of the first panoramic video. This may have the advantages as elucidated earlier following the introductory sentence "This may have various advantages" while noting that the advantages are there described for switching from a first panoramic video to a second panoramic video but apply also to switching from a second panoramic video to a first panoramic video. It will be appreciated that the streaming client may be an embodiment of the streaming client as defined elsewhere in this specification, but may not necessarily need to be.

In a further of aspect of the invention, a system is provided which comprises a streaming server and a streaming client as described in this specification.

In an embodiment of the shared video data, the shared video comprises at least one of:
- a part of the first panoramic video which is to be spatially adjoined with the first viewpoint-specific video content and/or the second viewpoint-specific video content for rendering a respective panoramic video;
- a part of the first panoramic video which is to be overlaid over, or underlaid under, the first viewpoint-specific video content and/or the second viewpoint-specific video content for rendering a respective panoramic video; and
- a part of the first panoramic video which is spatially disjunct from the first viewpoint-specific video content and/or the second viewpoint-specific video content.

In a further of aspect of the invention, a computer-implemented method may be provided of authoring one or more video streams representing a panoramic video of a scene. The method may comprise:
- accessing a first panoramic video, wherein the first panoramic video may show the scene from a first viewpoint within the scene;
- accessing a second panoramic video, wherein the second panoramic video may show the scene from a second viewpoint within the scene;
- identifying shared video data which may represent shared video content of the scene, wherein the shared video content may comprise video content of the scene which may be visible in the first panoramic video and in the second panoramic video;
- identifying first viewpoint-specific video data which may represent first viewpoint-specific video content of the scene, wherein the first viewpoint-specific video content may comprise video content of the scene which may be part of the first panoramic video and not part of the shared video content of the scene; and
- encoding the first panoramic video by:
  - encoding the first viewpoint-specific video data as a first viewpoint-specific video stream and encoding the shared video data as a shared video stream; or
  - encoding the first viewpoint-specific video data and the shared video data as a video stream, wherein the shared video data may be included in the video stream as an independently decodable part of the video stream.

In a further of aspect of the invention, an authoring system may be provided for authoring one or more video streams representing a panoramic video of a scene. The authoring system may comprise:
- a data storage interface for:
- accessing a first panoramic video, wherein the first panoramic video may show the scene from a first viewpoint within the scene;
- accessing a second panoramic video, wherein the second panoramic video may show the scene from a second viewpoint within the scene;
- a processor subsystem which may be configured to:
- identify shared video data which may represent shared video content of the scene, wherein the shared video content may comprise video content of the scene which may be visible in the first panoramic video and in the second panoramic video;
- identify first viewpoint-specific video data which may represent first viewpoint-specific video content of the scene, wherein the first viewpoint-specific video content may comprise video content of the scene which may be part of the first panoramic video and not part of the shared video content of the scene; and
- encode the first panoramic video by:
  - encoding the first viewpoint-specific video data as a first viewpoint-specific video stream and encoding the shared video data as a shared video stream; or
  - encoding the first viewpoint-specific video data and the shared video data as a video stream, wherein the shared video data may be included in the video stream as an independently decodable part of the video stream.

The video data of a panoramic video may be authored by an authoring system, which authoring may generally involve identifying viewpoint-specific video data and shared video data and encoding both of said data, for example as separate video streams or as one video stream in which the shared video data is an independently decodable part. An example of the latter is a tiled video stream in which one or more tiles may be independently decodable and independently streamable in the form of sub-streams of the tiled video stream. In some examples, the authoring system may also generate metadata or part of the metadata as described in this specification.

In a further aspect of the invention, a computer-readable medium may be provided which may comprise transitory or non-transitory data representing a computer program. The computer program may comprise instructions for causing a processor system to perform any method described in this specification.

In a further aspect of the invention, a computer-readable medium may be provided which may comprise transitory or non-transitory data defining a data structure, the data structure representing metadata which may identify video data of a video stream as representing shared video content of a scene, wherein the metadata may be indicative of the shared video content being visible in at least a first panoramic video and a second panoramic video of the scene. The data structure may be associated with the first and second panoramic videos, in that it may be provided to a streaming client to enable the streaming client to render either panoramic video from the video data received from a streaming server, which video data may comprise viewpoint-specific video data and shared video data. In other words, the metadata may identify the shared video data as being suitable to be used in the reconstruction of the first and the second panoramic videos, namely by containing video content which is shared amongst both panoramic videos. For example, the metadata may contain an identifier of the shared video data and identifiers of the respective panoramic videos, and/or the viewpoint-specific video data of said panoramic videos, to enable the streaming client to identify the shared video data as representing shared video content of the respective panoramic videos. In some examples, the metadata may define additional properties, for example of the scene, a respective panoramic video, the shared video data and/or respective viewpoint-specific video data, as also defined elsewhere in this specification.

In accordance with an abstract of the specification, a streaming server and a streaming client are described, with the streaming server being configured for streaming video data representing a panoramic video of a scene to the streaming client. The panoramic video may show the scene from a viewpoint within the scene, with the viewpoint being one of a plurality of viewpoints within the scene. When streaming first video data of a first panoramic video, and when starting to stream second video data of a second panoramic video, it may at least temporarily and simultaneously be continued to stream at least part of the first video data by continuing to stream a part of the first video data which represents shared video content of the scene which is visible in the first panoramic video and in the second panoramic video, while additionally streaming second viewpoint-specific video data which represents viewpoint-specific video content of the scene.

It will be appreciated by those skilled in the art that two or more of the above-mentioned embodiments, implementations, and/or aspects of the invention may be combined in any way deemed useful.

Modifications and variations of any one of the systems or devices (e.g., streaming server, streaming client), methods, metadata and/or computer programs, which correspond to the described modifications and variations of another one of these systems or devices, methods, metadata and/or computer programs, and vice versa, may be carried out by a person skilled in the art on the basis of the present description.

FURTHER REFERENCES

[3] T. Su, A. Sobhani, A. Yassine, S. Shirmohammadi, and A. Javadtalab. *A DASH-based HEVC multi-view video streaming system*. Journal of Real-Time Image Processing, 12(2):329-342, August 2016

BRIEF DESCRIPTION OF THE DRAWINGS

These and other aspects of the invention are apparent from and will be elucidated with reference to the embodiments described hereinafter. In the drawings.

FIG. 7 illustrates an object having different angular sizes in different domes;

Figure 1A:
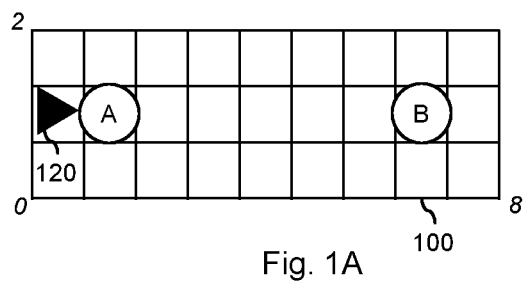
FIGS. 1A and 1B show a schematic top-down view of a scene of which omnidirectional videos are captured at different viewpoints A and B, with the scene comprising an object which is visible from both viewpoints A and B.

It should be noted that items which have the same reference numbers in different figures, have the same structural features and the same functions, or are the same signals. Where the function and/or structure of such an item has been explained, there is no necessity for repeated explanation thereof in the detailed description.

REFERENCE SIGNS LIST

The following list of references and abbreviations is provided for facilitating the interpretation of the drawings and shall not be construed as limiting the claims.

A-D viewpoints
CL streaming client
DM(X) dome (X)
$N_x$ angular size
OBJ(X) object (X)
SRV streaming server
100, 102 top-down schematic view of scene
110 ground
120 currently selected viewpoint
130 camera at viewpoint A
132 camera at viewpoint B
140 omnidirectional image acquisition from viewpoint A
142 omnidirectional image acquisition from viewpoint B
150 dome representing shared video content of viewpoint A, B
160 transition between viewpoints
170 viewpoint
172 time
200 streaming server
220 network interface
222 data communication
240 processor subsystem
260 data storage
300 streaming client
320 network interface
322 data communication
340 processor subsystem
360 display output
362 display data
380 display
400 authoring system
420 network interface
422 data communication
440 processor subsystem
460 data storage
500 computer-readable medium
510 non-transitory data
1000 exemplary data processing system
1002 processor
1004 memory element 1006 system bus
1008 local memory
1010 bulk storage device
1012 input device
1014 output device
1016 network adapter
1018 application

DESCRIPTION OF EMBODIMENTS

The following embodiments relate to the streaming of video data to a streaming client. In particular, the video data may represent a panoramic video of a scene, with the panoramic video showing the scene from a viewpoint within the scene. The viewpoint may be one of a plurality of viewpoints within the scene. Accordingly, a plurality of panoramic videos of the scene may be available for streaming. For example, these panoramic videos may have been previously acquired, e.g., by a plurality of cameras, or may have been previously synthetically generated, or may in some examples be generated in real-time. An example of the latter is a soccer match in a soccer stadium being recorded by a plurality of panoramic cameras corresponding to different viewpoints within the stadium, each viewpoint being selectable for streaming.

In case a panoramic video is originally acquired at or generated for a viewpoint, e.g., by an omnidirectional camera or by offline rendering, such a panoramic video may also be referred to as a pre-rendered view-area (PRVA), referring to the video content being available in a pre-rendered manner to a streaming client, rather than the streaming client having to synthetically generate the video content.

By way of example, the following examples assume the panoramic videos to be omnidirectional videos, e.g., 360° videos. However, this is not a limitation, in that the measures described with these embodiments equally apply to other types of panoramic videos, e.g., to 180° videos or the like. In this respect, it is noted that the panoramic videos may be monoscopic videos, but also stereoscopic videos or volumetric videos, e.g., represented by point clouds or meshes or sampled light fields.

A streaming server may be configured for streaming the video data of a respective viewpoint, for example in response to a request received from the streaming client. As will also be explained in more detail in the following, when starting to stream the video data of another viewpoint (which may elsewhere also be referred to as 'second' viewpoint), this video data may be streamed by continuing to stream at least part of the video data of the currently streamed viewpoint (which may also be referred to as 'first' viewpoint). This video data may also be referred to as 'shared' video data since it may represent shared video content of the scene which may be visible from the first viewpoint and from the second viewpoint. In addition to the shared video data, viewpoint-specific video data may be streamed to the streaming client which may represent viewpoint-specific video content of the scene. The viewpoint-specific video content may contain video content which is not contained in the shared video data.

The streaming client may then use the received shared video data and the received viewpoint-specific video data to reconstruct the panoramic video corresponding to the second viewpoint. Such reconstruction may comprise combining the shared video data with the viewpoint-specific video data, e.g., by adjoining or overlaying both types of video data. The above-described simultaneous yet separate streaming of the shared video data and viewpoint-specific video data may be continued at least temporarily. In some embodiments, the streaming client may later switch to an integral version of the panoramic video, or to another form of streaming video data.

The above and following refers to a similarity between video content. It will be appreciated that this may typically refer to a similarity between the image content of corresponding frames of videos, with 'corresponding' referring to the frames being acquired at substantially a same moment in time or in general pertaining to a similar point on a content timeline. General references to video content will be understood by the skilled person to include references to image content of video frames where the reference is to spatial information but not to the temporal information of a video.

Figure 1B:
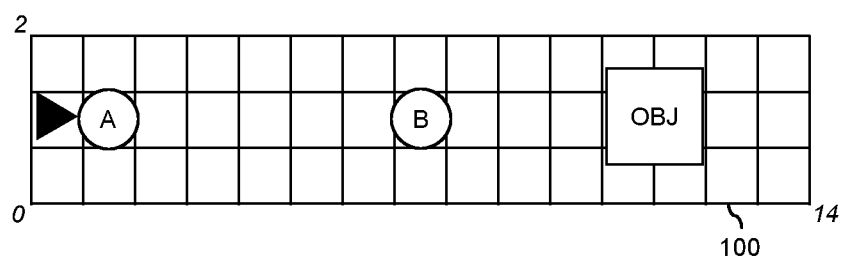

FIGS. 1A and 1B show a top-down view of a scene 100 of which omnidirectional videos are captured at different viewpoints A and B. Here and in other figures, the viewpoints are shown as circles containing letters identifying the respective viewpoints, being in FIGS. 1A and 1B viewpoints A and B. The currently selected viewpoint may here and elsewhere be indicated by a triangle 120, indicating that in this example, the video data of viewpoint A may be streamed to the streaming client.

The scene 100 is schematically shown in FIGS. 1A and 1B as a grid which may be addressable using a coordinate system. This grid-like representation may reflect that in some examples, the cameras recording the scene may be arranged in a grid-like manner in physical space, with the respective locations being representable as coordinates in the grid. The grid coordinates may for example correspond to actual geolocations, but may alternatively represent coordinates which have no direct physical analogy. In the example of FIGS. 1A and 1B, viewpoint A may thereby have coordinate (1, 1) in the scene, while viewpoint B may have coordinate (7,1) in the scene.

It can be seen in FIG. 1B that there may be an object in the scene, labeled 'OBJ' in FIG. 1B and elsewhere. The object may be visible from both viewpoints, with the main difference being that the object may appear larger from viewpoint B than from viewpoint A due to viewpoint B being closer to the object than viewpoint A. In other words, the object may appear larger in the video data of viewpoint B than in the video data of viewpoint A, but may otherwise be visible from both viewpoints. This example serves to illustrate that a part of a scene may be visible in several omnidirectional videos of the scene. It will be appreciated that in some examples, a large part of the scene may be visible in several omnidirectional videos, such as for example the sky.

It may be desirable to avoid streaming, and in some cases encoding, storing and/or decoding, redundant video data in omnidirectional videos. In some examples, a part of the scene may have a same appearance in several omnidirectional videos, not only in terms of size but also in terms of location. This means that video content in several omnidirectional videos may be substantially the same, and may thus be considered 'shared' video content. This may be particularly the case if an object is located at such a large distance with respect to the camera that the shift in viewpoint causes no apparent movement of the object. Again, this may be the case with the sky or objects in the distance, such as mountains or a skyline. In other examples, a part of the scene may be visible in several omnidirectional videos but may change in appearance between viewpoints, for example in terms of size, position and/or orientation. Such video content may also represent 'shared' video content, as will be elucidated elsewhere. In the above examples, the redundancy between viewpoints may be exploited by avoiding to stream redundant versions of the shared video content.

Figure 2A:
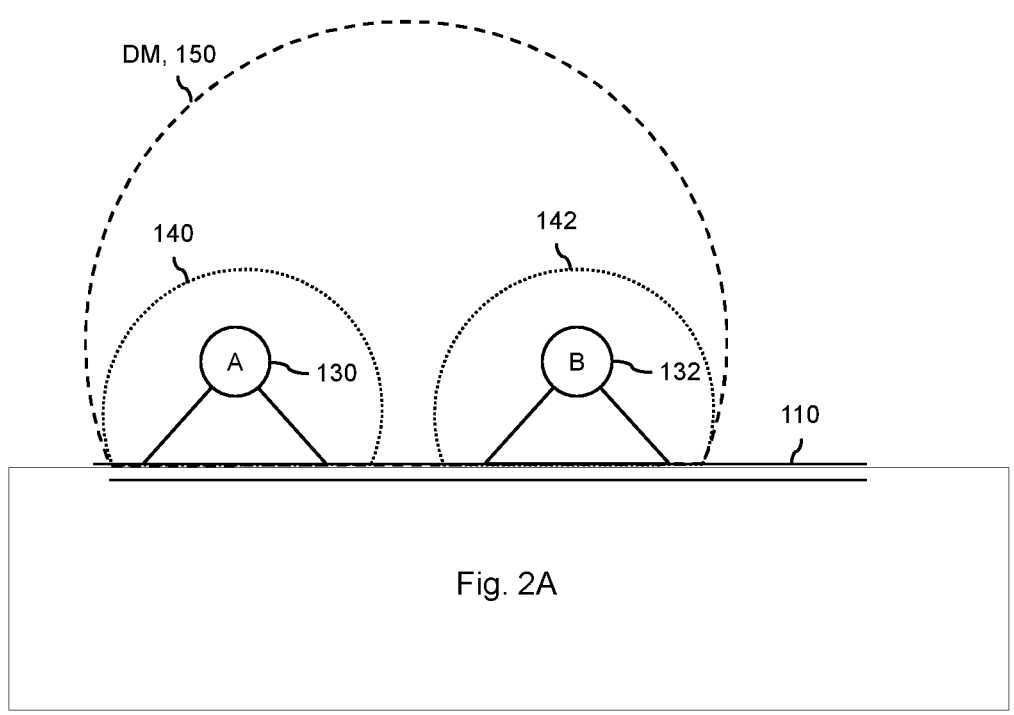
FIGS. 2A and 2B show a visual representation of video content which is visible from both viewpoints A and B as a dome covering viewpoints A and B.
Figure 2B:
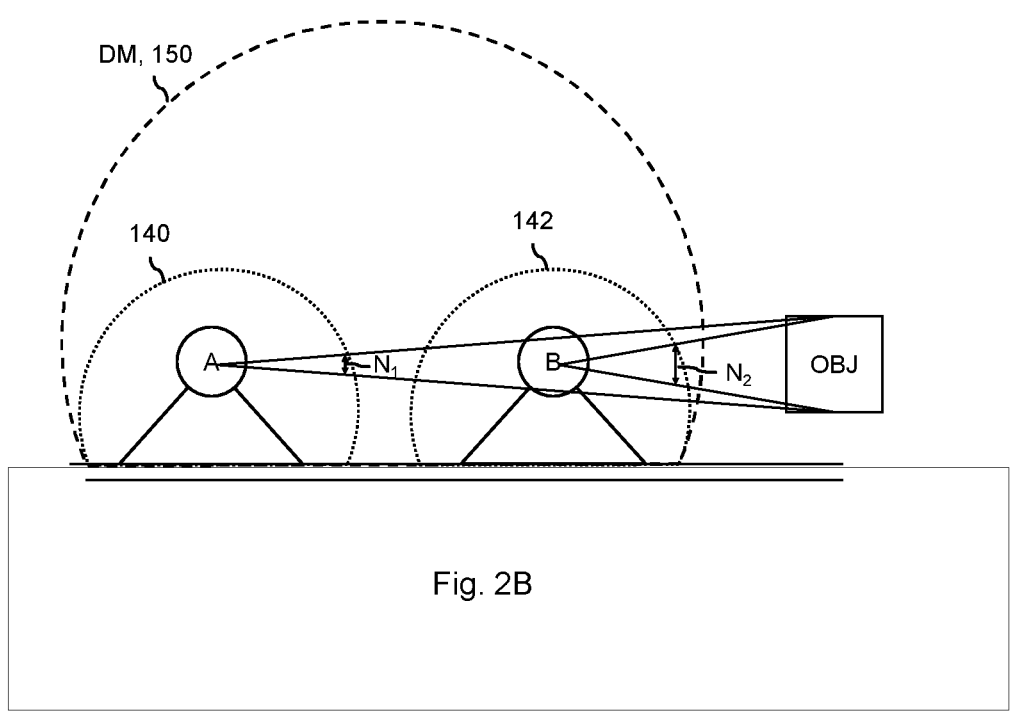

FIGS. 2A and 2B show a cross-sectional view of the scene of FIGS. 1A and 1B, in which the ground 110, camera A 130 and camera B 132 are shown, with each camera acquiring video data from respective viewpoints in an omnidirectional manner, as indicated in FIGS. 2A and 2B by domes 140, 142 representing the omnidirectional acquisition of each camera. FIGS. 2A and 2B further show a visual representation of the video content which is visible from both viewpoints A and B as an overarching dome 150 (labeled 'DM' in FIGS. 2A-2B) which encompasses the viewpoints A and B.

The 'dome' analogy may be understood by considering that omnidirectional video may in many cases be displayed by projecting the acquired video data on the inside of a dome or similar object, and placing a virtual camera within the dome. As such, an omnidirectional video, or parts thereof, may for that reason be represented as a virtual dome. In addition, as will be also elucidated elsewhere, the shared video data may in many cases contain video data of objects which are far away from the camera, such as the sky, a skyline of a city, trees in the distance, etc. For these faraway objects, the movement between viewpoints may cause no or only insignificant parallax to be apparent in these objects. Effectively, to a user, such video data may appear to be projected on a large overarching virtual dome. Also for this reason, the shared video data may in the following be referred to, and visually represented in the drawings, as a dome, with the video data defining a dome being thus an example of shared video data.

It will be appreciated that while the following may refer to the encoding, streaming, decoding, rendering, etc., of a dome, it is understood that this refers to the encoding, streaming, decoding rendering, etc., of the video data of the dome.

With continued reference to the 'dome' analogy, the shared video content may also be considered to represent a (partial) dome. For example, if the shared video data relates to the sky, this video data may be represented as a half dome. It will be appreciated that the adjective 'partial' may in the following be omitted, but with the understanding that the dome representing the shared video data may contain only a part of the video data of an omnidirectional video, e.g., one or more spatial regions.

While the following frequently refers to the sky as an example of shared video content, it will be appreciated that the shared video data may also pertain to objects which are relatively nearby to the camera yet visible from at least two different viewpoints. An example of such an object is shown in FIG. 2B, which shows the object OBJ of FIG. 1B being visible from viewpoints A and B but having a different size in each of the acquired omnidirectional videos, as indicated by the object having an angular size $N_2$ in the field of view of camera B which is larger than the angular size $N_1$ in the field of view of camera A. It will be further appreciated that the shared video data may not cover or need to cover large parts of a respective omnidirectional video, e.g., as in case of a sky in an outdoor setting, but may instead pertain to one or more smaller spatial regions, e.g., representing smaller individual objects. As such, the shared video data may be comprised of several separate spatial regions, or may, as described in the following embodiments, represent one of the spatial regions. The reference to the shared video data as a 'dome' is therefore understood not to be a limitation but rather as an intuitively understandable representation of common types of shared video data.

Basic Dome

A dome may be generated in the form of shared video data, or as metadata identifying the shared video data, after a scene's content is filmed or synthetically generated and the locations of the omnidirectional cameras (real or virtual) in space are known. The dome creation may make use of image recognition techniques that, on a frame-by-frame basis, identify pixels (or voxels or other image elements) which represent shared video content, for example by simply comparing the image data in a video frame acquired by camera A with that in a video frame acquired by camera B. A very simple algorithm may on a pixel-wise basis subtract the video data of camera B with that of camera A and may consider pixels to belong to the shared video data when the difference is below a certain threshold. More complex algorithms may find correspondences between video frames which take into account changes in appearance, such as size, position, and/or orientation. Finding correspondences between video frames is in itself widely known in the general field of video analysis, for example from the subfield of motion estimation, in which correspondences between temporarily adjacent video frames are estimated, or the subfield of disparity estimation, in which correspondences between a left and a right video frame from a stereo pair are estimated, or the subfield of (elastic) image registration, etc. Such techniques may also be used to find image data which is considered to be shared amongst video frames acquired from different viewpoints of the scene. As also described elsewhere, the correspondences may not only be determined but also encoded, e.g., as metadata, to enable the streaming client to reconstruct the appearance of the shared video data in a particular viewpoint. In a specific example, the correspondences may be estimated by estimating one or more affine transformations between image parts of different videos. The affine transformation(s) may then be signaled to the streaming client as metadata.

Any algorithm used to identify shared video content may preferably be made robust to camera acquisition noise, e.g., using techniques to increase the noise robustness, as are known per se. In addition, the different cameras may be genlocked so that video frames from different camera are acquired at a same point in time. If the cameras are not genlocked, the algorithm may consider that the frame rate of the video is high enough so that the apparent movement in the scene can be considered neglectable between any temporally closest video frames taken by different cameras.

The dome creation may in general result in a video stream for every viewpoint, with the video stream containing viewpoint-specific video content, and one or more video streams representing respective domes, which each dome containing shared video content between two or more viewpoints. At the streaming client, the viewpoint-specific video content and the one or more domes may then be used to reconstruct a panoramic video and thereby a PRVA for a specific viewpoint.

Information about the location of the domes may be included in a manifest file, such as a Media Presentation Descriptor (MPD), for example in a manner as described elsewhere in this specification. Here, the term 'location' may refer to information which allows the dome to be associated with one or more PRVA's and corresponding viewpoints. In addition, the manifest file may contain, or be indicative of, network location(s) via which the respective domes may be retrieved.

Another example to create a dome and viewpoint-specific video streams is using depth information. Namely, the distance from the optical center of each viewpoint and the point in the scene represented by a pixel (or voxel or other image element) in the video data may be calculated with such depth information. Pixel regions may then be clustered over the several viewpoints based on this depth information. For example, a dome may be generated by clustering pixels across different viewpoints which are at an equivalent distance in each of the viewpoints. In a specific example, the pixels at infinite distance may be considered to belong to the shared video content 'sky'.

With continued reference to FIGS. 2A and 2B, a viewpoint-specific video stream may be generated for the viewpoint A and another one for the viewpoint B, with each video stream omitting the pixels of the sky, but with omitted pixels being transmitted once for both video streams using a shared video stream representing the dome DM 150. In this example, the individual viewpoint-specific video streams may be generated by horizontally dividing the equirectangular video, referring to the division into a top and bottom part, thereby creating a top part for the dome and a viewpoint-specific bottom part. The video data of the dome itself may also be projected using an equirectangular projection, or in general using any other type of projection by which omnidirectional video data can be transmitted in a rectangular video frame.

In another example, the sky, being an example of a background object which is visible in different viewpoints, may be partially occluded by an object that shifts in position between viewpoints. This can for example be the case when the scene is an indoor scene in a building having a glass ceiling through which the sky is visible, with beams partially occluding the glass ceiling. In such an example, a dome may be generated by selecting the pixels of the sky which are visible from both viewpoints and by projecting these pixels on a new dome, for example using an equirectangular projection. The pixels that are unique for each viewpoint may be omitted from this dome. The video streams for viewpoints A and B may then be generated, for example by masking the pixels that are added to the dome with an opaque color (e.g., green). Effectively, such masking may 'remove' the shared video content from the original panoramic video, thereby generating the viewpoint-specific video.

The shared video content may also be encoded as independently decodable spatial segments, e.g., as 'tiles'. The metadata describing the position of tiles may be signaled to the streaming client in various ways, for example in the filename or as a property in the MPD. The streaming client may download these tiles for a specific point in time, determine the location of the tile on the dome and render the tile accordingly. Such tile-based encoding and rendering may be beneficial if the spatial regions representing the shared video content are relatively small but high resolution.

In some example, a dome may also be generated as, or may comprise, a static image which may represent at least part of the shared video content for at least a plurality of video frames, for example by indicating a time duration. The image may in some examples contain a texture which may be tiled to fill a spatial region. In some examples, the dome may also be generated as, or may comprise, a spatial region filled by a color. Metadata may describe the color and the spatial region in the dome that is to be filled with this color. This may be defined in a manifest file, e.g., as follows:

```
<grid startingPoint="0, 0, 0.5, 0" >
    <dome pts=" duration="" region="x,y;x,y;x,y" color="">
        <prva id="a"/>
```

```
        <prva id="b"/>
    </dome>
</grid>
```

Region: may define a region that comprises at least three points on the dome, with each point being defined by x, y values. At least three points may be needed to define a shape. The x, y values may be separated by ';'

PTS, short for 'Presentation TimeStamp': the presentation time when this dome is to be displayed Duration: the duration for displaying in seconds (decimal)

Color: may define the color in RGB, HSL, hexadecimal, etc.

It is noted that in this and other examples, a dome may be defined to be usable for reconstruction of one or more PRVA's, with the PRVA's being identified by respective identifiers, being in this example PRVA's identified by identifiers "a" and "b".

Downloading and Rendering a Dome

Figure 3:
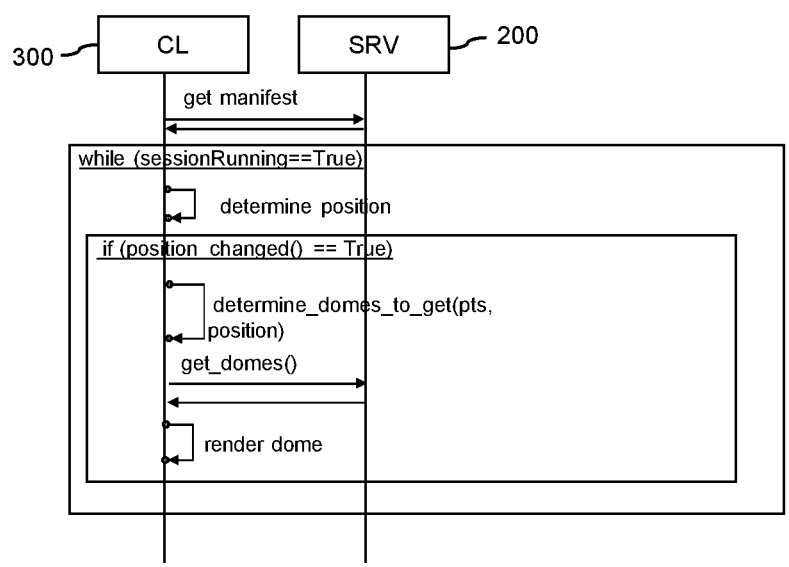
FIG. 3 shows a message exchange between a streaming client and a streaming server for downloading and rendering video data representing a dome.

FIG. 3 shows a message exchange between a streaming client 300 (labeled 'CL') and a streaming server 200 (labeled 'SRV') for downloading and rendering video data representing a dome. This message exchange may relate to the following: before an omnidirectional video can be rendered which uses shared video data in the form of a dome, the dome may need to be downloaded. FIG. 3 shows an example of a message exchange between the streaming client 300 and the streaming server 200 to download the dome. In particular, the streaming client 300 may first retrieve a manifest from the streaming server 200, and then during a running session, determine a position within a scene, referring to the position of a currently selected viewpoint. If the position changes, for example due to a user selection or a selection by the streaming client 300 itself, the streaming client 300 may determine on the basis of the manifest which dome(s) are needed to render the omnidirectional video at the new position, and subsequently retrieve those dome(s) from the streaming server 200. Having retrieved the dome(s) from the streaming server 200, the streaming client 300 may in some embodiments then render the dome(s) as part of the omnidirectional video. For that purpose, although not shown in FIG. 3, the streaming client 300 may additionally retrieve viewpoint-specific video content for the new position from the streaming server 200. The viewpoint-specific video content and the dome(s) may be combined by the streaming client 300 in various ways, for example by projecting the video content of the viewpoint-specific video content on top of the dome, e.g., by overlaying the video content. To enable a simple type of overlaying at the streaming client, it may be arranged, e.g., at the streaming server or at an authoring system when authoring the video data, that the used coordinate system and used projection types are the same for the viewpoint-specific video content and a dome. In some examples, the viewpoint-specific video content may be formatted as a dome, e.g., using an equirectangular projection, but may comprise parts which do not contain video data. Such parts may be made transparent so as to enable the corresponding video data of the dome to remain visible despite the overlaying of the viewpoint-specific video content over the dome.

Creation of a Manifest File with Dome Information

The following describes the creation of a manifest file which contains dome information to enable the streaming client to correctly use the dome when rendering an omnidirectional video on the basis of a retrieved dome. By way of example, the following refers to an MPD as defined in the co-pending application EP 19 219 597.2, but it will be appreciated that such dome information may also be made available as part of a different type of manifest, or in general as different types of metadata. In the following, it is assumed that the dome is formatted as an omnidirectional video, e.g., using an equirectangular projection, which may be rendered in the same way as a PRVA. To enable the streaming client to render the dome, the following attributes may be included in the MPD, or in general in the manifest:

ID: Name of a dome

Offset: At which point in time, relatively to the timeline of the base-media (which may also be referred to as base-timeline), will the dome be rendered.

URI: Web-location via which the dome may be retrieved.

The location of the dome may depend on which PRVAs the dome covers, or in other words, with which viewpoint-specific video data the shared video data of the dome may be combined. The domes may contain references to identifiers of PRVA's. This allows a PRVA to be reconstructed from the viewpoint-specific video content of the PRVA and from multiple domes (see also the section on 'overlapping domes').

An example of dome information is the following:

viewpoint-specific video data and several instances of shared video data, e.g., several domes. Effectively, a PRVA may thus be part of one or more domes and one dome may contain one or more PRVAs. This creates the possibility of overlapping domes.

Figure 4A:
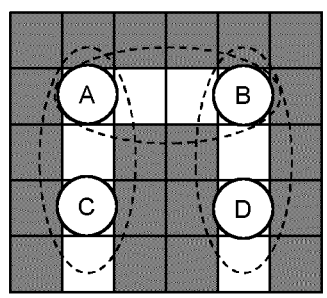
FIGS. 4A-4C show different types of overlapping domes for different types of scenes, namely in FIG. 4A for a corridor and in FIGS. 4B and 4C for open fields.
Figure 4B:
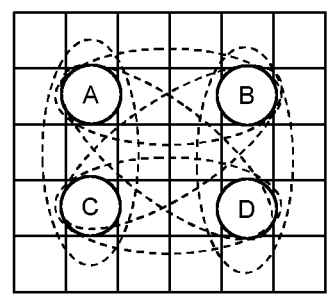
Figure 4C:
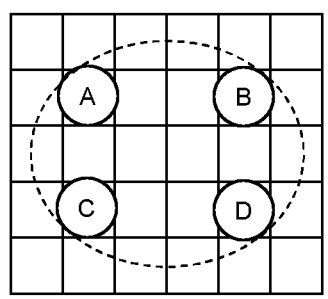

FIGS. 4A-4C show different types of overlapping domes for different types of scenes, namely in FIG. 4A a corridor and in FIGS. 4B and 4C open fields. Here, each viewpoint A-D may have their own viewpoint-specific content while each dashed circle/ellipse may represent a dome. As can be seen in FIG. 4A, in a corridor, where a user may transition from viewpoint C to A to B to D, the domes may be defined to apply to two viewpoints and to mutually overlap by one viewpoint to create a sequence of domes. In case of an open field, all cameras may be in sight of each other and jointly observe the scene. If the same principle is applied as in FIG. 4A for the creation of domes, this may result in a large number of domes being generated for relatively few viewpoints, as illustrated in FIG. 4B. Every dome may be a separately decodable stream. This may create significant redundancy between domes. It may be possible to combine the domes of FIG. 4B into one overarching dome, as illustrated in FIG. 4C. Whether this is beneficial may depend on the entropy of the encoded domes and the difference in

```
<grid startingPoint="0, 0, 0.5, 0" >
  <prva id="a" masterTimeline="true" mpd="uri://..." model="uri://..." offset="0" row="0" column="0" x="1" y="1"/>
  <prva id="b" url="uri://..." mime Type="application/dash+xml " model="uri://..." offset="-10" row="0" column="6" x="1" y="1"/>
  <prva id="c" url="uri://..." mimeType="application/dash+xml " model="uri://..." offset="10" row="3" column="3" x="1" y="1"/>
  <prva id="d" url="uri://..." mimeType="application/dash+xml " model="uri://..." offset="10" row="6" column="0" x="1" y="0"/>
  <dome uri="uri://..." id="dome1" offset="0">
    <prva id="a"/>
    <prva id="c"/>
  </dome>
  <dome uri="uri://..." id="dome2" offset="0">
    <prva id="a"/>
    <prva id="b"/>
  </dome>
  <dome id="dome3">
    <prva id="b"/>
    <prva id="d"/>
  </dome>
</grid>
```

Tiled Streaming

A dome may be omnidirectional. In many examples, a streaming client may only render a part of the omnidirectional video at once, for example the part that a user is currently viewing with a head-mounted display (HMD). This may mean that not all of the omnidirectional video may be displayed at any one time. Streaming all of the omnidirectional video may therefore be unnecessary. To reduce the amount of data which is transmitted, tiled streaming may be used. For that purpose, the dome and/or the viewpoint-specific video content may each be partitioned over one or more tiles. The streaming client may then only retrieve those tiles which may be currently needed, e.g., for the rendering of an omnidirectional video or for precaching purposes. Any retrieved tiles may be stitched together locally at the streaming client and rendered at their respective location.

Overlapping Domes

There may be a one-to-many relation between, one the one hand, a viewpoint and viewpoint-specific video data, and on the other hand, shared video data, in that an omnidirectional video as a PRVA may be reconstructed using size of the overarching dome to that of the individual domes. For example, for a clear sky, the size of the overarching dome may be almost the same as the size of all individual domes together. However, if the sky contains many irregularities such as hot air balloons and clouds, the sum of the individual domes may easily exceed the size of the overarching dome. An overarching dome may be created 'offline' e.g., during authoring by an authoring system. However, an overarching dome may also be created in real-time.

Figure 5:
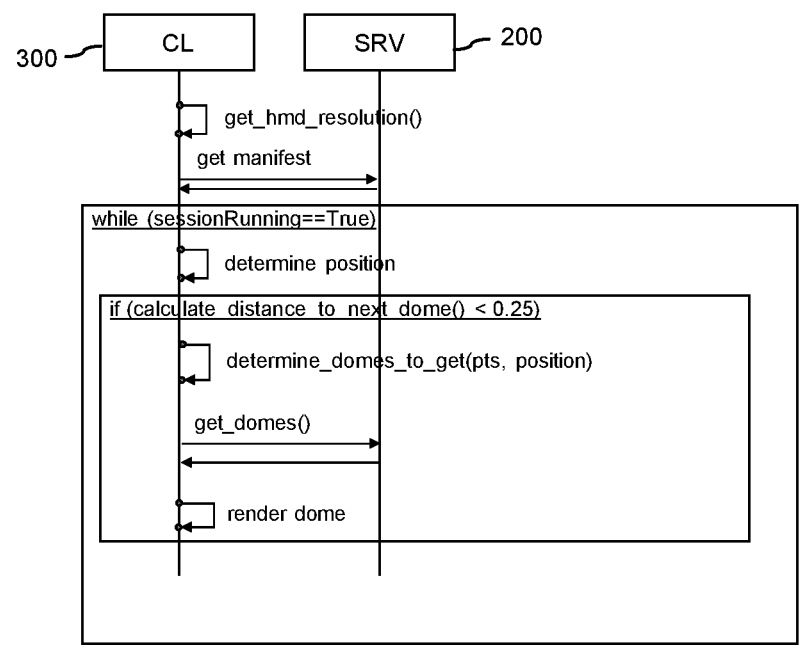
FIG. 5 shows a message exchange between a streaming client and a streaming server for switching between the video data of different domes.

FIG. 5 shows a message exchange between a streaming client 300 and a streaming server 200 for switching between the video data of different domes. In this example, the streaming client 300 may first determine the resolution of the display, e.g., of an HMD, then retrieve a manifest from the streaming server 200, and then during a running session, determine a position within a scene, referring to the position of a currently selected viewpoint. The streaming client 300 may then determine the distance to the next dome, for example using a function called 'calculate_distance_to_next_domed( )'. If this distance is smaller than a threshold, this may prompt the streaming client 300 to retrieve the next dome from the streaming server 200. In this example, the user may move from viewpoint C to viewpoint A in the scene shown in FIG. 4A. Firstly, a first dome covering viewpoints A and C may be downloaded and rendered. When the result of the function is smaller than 0.25, ¾ of the distance to viewpoint A is covered. At this point, the streaming client 300 may download and render a second dome covering viewpoints A and B. By doing so, only one dome may need to be downloaded and decoded at any one point in time.

Sharing Video Content

There may exist different versions of video content. For example, if viewpoint A shows the sky and viewpoint B shows the same sky, a dome may be generated based on the sky of viewpoint A and/or on the sky of viewpoint B. Conversely, the panoramic videos at viewpoint A and B may be reconstructed based on the viewpoint-specific video content of viewpoint A, the viewpoint-specific video content of viewpoint B, and a dome representing a version of the shared video content, e.g., as derived from the panoramic video of viewpoint A or B, or in some examples as derived from both the panoramic videos of viewpoint A or B. In the latter example, some parts of the shared video content may be derived from the panoramic video of viewpoint A while other parts of the shared video content may be derived from the panoramic video of viewpoint B, for example by selecting parts based on image quality criteria or spatial resolution of objects in the video data (e.g., deriving the image data of an object from the panoramic video in which the object is closer to the camera).

In some examples, it may be omitted to format the shared video content as a separate file or video stream. Instead, metadata may be generated which may define which part of the video content of a panoramic video represents shared video content. In some examples, the panoramic video may be formatted to allow independent retrieval and decoding of spatial segments, e.g., in the form of tiled encoding. In such examples, the metadata may indicate the spatial segments or tiles representing the shared video content to allow a streaming client to independently decode, and in some examples retrieve, the spatial segments or tiles of the shared video content.

In some examples, multiple versions of the shared video content may be available, and the streaming server and client may switch from streaming one version to streaming another version. There are various of such examples, which may involve the use of one or two decoders. Using two decodes may be beneficial when the streaming client has multiple hardware decoders, e.g., a H265 decoder and a H264 decoder.

A first example may comprise:
1. The streaming server may signal which part of a video stream representing viewpoint A is visible in viewpoint B. This part may represent the shared video content between viewpoints A and B, and effectively a 'dome'.
2. When user moves from viewpoint A to viewpoint B within the scene, the streaming client may continue to receive stream A and additionally retrieve viewpoint-specific video data of viewpoint B.
3. The streaming client may render the viewpoint-specific video data of viewpoint B while still rendering the shared video data from the stream of viewpoint A.
4. When a stream access point is reached in an integral video stream of viewpoint B, the streaming client may switch to this integral video stream.

A second example may make use of tiled streaming. This example assumes the overall omnidirectional video to comprise viewpoint-specific video content below the horizon and a blue sky, which may be visible in several viewpoints, e.g., A, B and C, above the horizon. The omnidirectional video of viewpoint B may then be reconstructed using the version of the sky from viewpoint A, while the omnidirectional video of viewpoint C may then be reconstructed using the version of the sky of viewpoint B, etc.

Figure 6A:
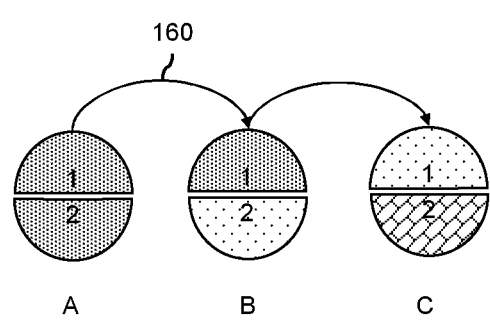
FIG. 6A illustrates omnidirectional videos at different viewpoints A, B, C which are reconstructed from viewpoint-specific video data and from shared video data.

FIG. 6A illustrates the second example, in which omnidirectional videos at different viewpoints A, B, C are reconstructed from viewpoint-specific video data and from shared video data. In particular, it may be assumed that viewpoint A may at a given moment in time be reconstructed from video data representing the sky of viewpoint A and from video data representing the scene below the horizon (the 'ground') in viewpoint A. Both types of video content may thus be derived from the omnidirectionally acquired video data of a camera at viewpoint A, as shown by A1 (sky) and A2 (ground) having the same shading in FIG. 6A. When transitioning to viewpoint B (arrow 160 in FIG. 6A), the ground B2 of viewpoint B may be streamed to the streaming client and used to reconstruct the omnidirectional video of viewpoint B, while the sky A1 of viewpoint A may be continued to be streamed to the streaming client and used to reconstruct the omnidirectional video of viewpoint B. The streaming client may then switch to the sky B1 of viewpoint B (not shown explicitly in FIG. 6A) at some point in time, for example by switching to the overall panoramic video of viewpoint B when a stream access point is reached in the panoramic video of viewpoint B. When later transitioning to viewpoint C, the ground C2 of viewpoint C may be streamed to the streaming client and used to reconstruct the omnidirectional video of viewpoint C, while the sky B1 of viewpoint B may be continued to be streamed and used to reconstruct the omnidirectional video of viewpoint C.

FIG. 6A may thus effectively show that the sky A1 may be used to reconstruct the omnidirectional video of B as an alternative to B1. This may mean that the sky B1 may not need to be immediately transferred to the streaming client.

Figure 6B:
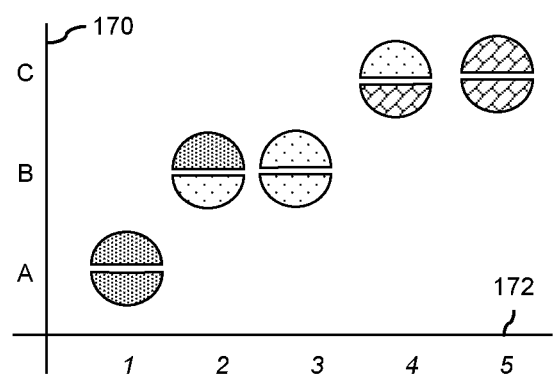
FIG. 6B illustrates a switching between viewpoints A, B, C over time, wherein a first version of shared video data is continued to be streamed after switching to a new viewpoint, with the first version of the shared video data being derived from the omnidirectional video of the previous viewpoint and being replaced by a second version of the shared video data from the omnidirectional video of the new viewpoint.

FIG. 6B illustrates a switching between viewpoints A, B, C over time. In particular, FIG. 6B shows along the horizontal axis the time 172 and along the vertical axis the viewpoint 170, being in this example viewpoints A, B and C, while showing an omnidirectional video as an above-the-horizon part and a below-the-horizon part in a similar manner as in FIG. 6A. Respective parts derived from one originally acquired omnidirectional video are shown with the same shading. In particular, FIG. 6B may relate to the following: different versions of shared video content, as may be derived from different omnidirectional videos, may mutually differ insignificantly or significantly. For example, the sky or other video content between viewpoint A and viewpoint B may be very similar in terms of appearance. This may enable, when switching from viewpoint A to viewpoint B, the sky being continued to be received by streaming from the omnidirectional video of viewpoint A. However, the sky in viewpoint C may be noteworthy different from the sky in viewpoint A. Therefore, at time instance 3, the streaming client may retrieve a version of the sky which was originally acquired at viewpoint B, thereby rendering the originally acquired omnidirectional video for viewpoint B. This enables the streaming client to, when switching to viewpoint C, temporarily continue to obtain the sky from the omnidirectional video of viewpoint B, before switching a version of the sky from the omnidirectional video of viewpoint C.

Domes, or in general shared video content, may be generated in various ways, for example automatically or semi-automatically by an authoring system, or manually by a user.

Two examples of dome creation may be:
1. Non-tiled approach
   a. Video content, e.g., in the form of equirectangular projections, of two or more panoramic videos may be compared to identify shared video content
   b. A manifest, for example in the form of an MPD, may be created with a dome element which identifies the shared video content as a spatial region.
2. Tiled-streaming approach
   a. Tiles from two or more panoramic videos may be compared to identify shared video content
   b. A manifest, for example in the form of an MPD, may be created which may contain references to the tiles of a panoramic video which represent such shared video content
   c. Duplicate tiles, e.g., representing different version of shared video content, may be removed, e.g., if storage at the streaming server is limited. Conversely, if there is sufficient storage available, duplicate tiles may be maintained, which may allow switching between the different versions of the shared video content, for example to select a version which shows an object at a highest spatial resolution. With continued reference to the generation of a manifest, which is in the following examples an MPD, the MPD may be generated or modified to indicate which part of a panoramic video may represent shared video content, e.g., as follows:

```
<dome id="dome1" uri="prva:a" x="0" y="0" width="200" height="200">
    <prva id="a" uri="uri://..."/>
    <prva id="b"/>
</dome>
```

Here the uri of the dome may indicate that the dome uses the resource of panoramic video A. The parameters x, y, width and height may define the part of the area in the (equirectangular) content that is shared between panoramic videos A and B and thereby represents the shared video content or dome.

For an example using tiled streaming, the MPD may be generated to define a dome by referencing the appropriate tiles. In such cases, tiles may be referenced which do not need to be spatially connected. An example of how a dome may be defined in tiled streaming is given in the following:

```
<prva id="a">
    <tile id="1">
        <segment id="" pts=""></segment>
        <segment id="" pts=""></segment>
    </tile>
    <tile="2">
        <segment id="" pts=""></segment>
        <segment id="" pts=""></segment>
    </tile>
</prva>
<prva id="b">
    <tile id="1">
        <segment id="" pts=""></segment>
        <segment id="" pts=""></segment>
    </tile>
    <tile id="2">
        <segment id="" pts=""></segment>
        <segment id="" pts=""></segment>
    </tile>
</prva>
```

Each dome may comprise multiple tiles and one tile may be part of multiple domes. This many-to-many relationship may be created in the following way:

```
<tiled-dome id="dome1":
    <dome-tile id="1">
        <reference-tile prva-id="a", tile-id="1"/>
    </dome-tile>
```

A dome-tile may reference multiple reference-tiles, referring to originally acquired or generated tiles of a panoramic video. In particular, such multiple reference-tiles may represent different versions of shared video content. This may be useful when video content between panoramic videos is shared but an object is shown in one of the panoramic videos at a higher spatial resolution because of the spatial location of the camera within the scene. A streaming client may decide to switch between reference-tiles depending on its location in the scene. In case both tiles contain the same content, the streaming server may decide to remove such duplicate tiles.

Transformation

It may be that video content between two panoramic videos is not the same or substantially the same, but still similar in appearance. A dome may be created by using the video content from one panoramic video. To reconstruct the other panoramic video, a transformation function may be applied to the dome. An example of an MPD describing this is shown in the following.

```
<grid startingPoint="0, 0, 0.5, 0" >
    <prva id="a" masterTimeline="true" mpd="uri://..." model="uri://..." offset="0" row="0" column="0" x="1" y="1"/>
    <prva id="b" url="uri://..." mime Type="application/dash+xml " model="uri://..." offset="-10" row="0" column="6" x="1" y="1"/>
    <prva id="c" url="uri://..." mime Type="application/dash+xml " model="uri://..." offset="10" row="3" column="3" x="1" y="1"/>
    <prva id="d" url="uri://..." mime Type="application/dash+xml " model="uri://..." offset="10" row="6" column="0" x="1" y="0"/>
    <dome uri="uri://..." id="dome1" offset="0">
        <prva id="a"/>
        <prva id="b"/>
    </dome>
    <dome id="dome2" data="transform(prva:c, x,y,z)" uri="prva:c" x="0" y="0" width="200" height="200">
```

```
    <prva id="c" uri="uri://..."/>
    <prva id="d"/>
  </dome>
</grid>
```

The transformation may for example be a warp or perspective-change transform, or any other type of spatial transformation. Another specific example is an affine transformation.

The manifest file may enable the streaming client to determine to which dome the transformation is to be applied, what the transformation is, and what other parameters the transformation may require. The transformation may for example be defined as a function receiving video content and parameters as input and providing transformed video content as output. The manifest file may indicate that only a part of the dome needs to be processed by the transformation, e.g., not the entire 'dome1' in the above example but only a part of 'dome1'. Alternatively, the transform may also be made available to the streaming client via a URL 'transform-uil' where the streaming client may download an executable function, e.g., based on JavaScript, WebGL, C, etc., to be used to transform the video content of one dome to obtain another dome.

Per shared-dome-tile a transformation can be applied in a similar manner as described in previous paragraphs. This way even tiles that do not exactly match each other can be used. Also, one tile plus a transform function might be sufficient to create a big part of the dome. An example is given in the table below.

```
<shared-tiled-dome id="shareddome1">
  <shared-dome-tile id="1" type="exact-copy" >
    <reference-dome-tile prva-id="a", tile-id="1"
    data="transform(x, y, z)" />
  </shared-dome-tile>
</shared-tiled-dome>
```

Nested Domes

FIG. 7 illustrates an object OBJ having different angular sizes in different domes DM1, DM2, as indicated by the object having an angular size $N_3$ in dome DM1 which is smaller than the angular size Na in dome DM2. When moving from viewpoint B to C, one may switch from dome DM1 to dome DM2 halfway between the two domes. However, this may result in a visible jump in perceived quality of the object OBJ. To avoid or reduce such a visible jump, video content of dome DM1 may be blended with video content of dome DM2, e.g., using a blending function. However, this may require both domes to be at least temporarily streamed and decoded simultaneously.

Figure 8:
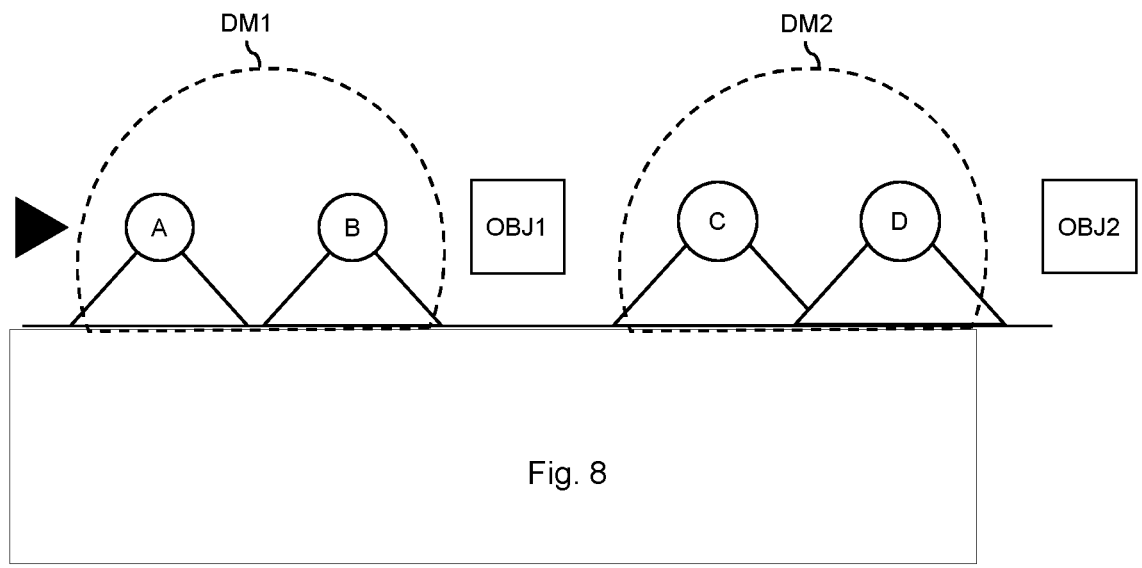
FIG. 8 illustrates how a smooth transition may be obtained when moving from viewpoint A to D while switching between two different domes.
Figure 9:
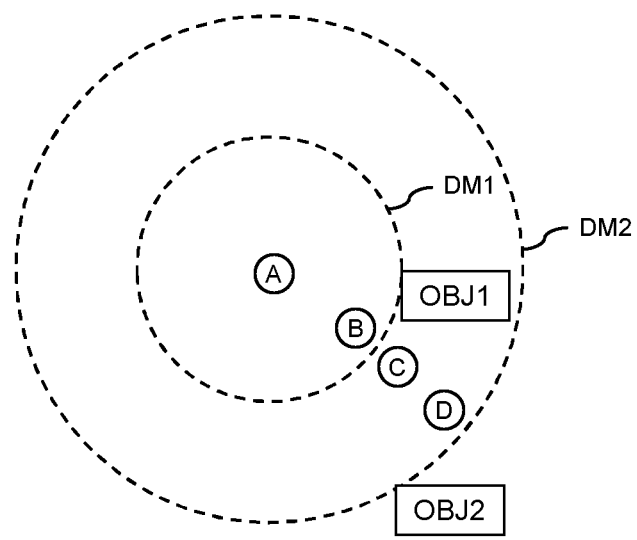
FIG. 9 illustrates domes being nested.

FIG. 8 shows a similar example as in FIG. 7, but shows dome DM1 to be used for viewpoints A and B and dome DM2 for viewpoints C and D. In addition, FIG. 8 shows two objects OBJ1, OBJ2, with the first object OBJ1 being nearest to dome DM1 and the second object OBJ2 being nearest to dome DM2. When generating the domes, it may be decided to encode the video data of the first object OBJ1 only as part of the dome DM1 and the video data the second object OBJ2 only as part of the dome DM2. This may result in a nesting of domes, e.g., in an onion-type of arrangement of domes, as also shown in FIG. 9. This may mean that in order to render the omnidirectional video from viewpoint A, in which the first object OBJ1 is shown nearby and the second object OBJ2 is shown in the distance, video content from both domes DM1, DM2 may be retrieved. To indicate this to the streaming client, a "parent" property may be added to the dome element, which may contain multiple values separated with ';':

```
<grid startingPoint="0, 0, 0.5, 0" >
  <prva id="a" masterTimeline="true" mpd="uri://..." model="uri://..." offset="0" row="0" column="0" x="1" y="1"/>
  <prva id="b" url="uri://..." mime Type="application/dash+xml " model="uri://..." offset="-10" row="0" column="6" x="1" y="1"/>
  <dome uri="uri://..." id="dome1">
    <prva id="a"/>
    <prva id="b"/>
  </dome>
  <dome uri="uri://..." id="dome2" parent="dome1">
    <prva id="c"/>
    <prva id="d"/>
  </dome>
</grid>
```

When domes are retrieved recursively, this may result in the streaming client retrieving all domes of a scene. This may require too much bandwidth. To reduce the necessary bandwidth, the viewing direction of the streaming client may be used to retrieve only a subset of domes. Here, the term 'viewing direction' may be understood as referring to a client rendering only a subset of the omnidirectional video along a certain viewing direction in the scene. For that purpose, the aforementioned function 'determine_domes_to_get(pts, position)' may be extended with a parameter called named 'viewing_direction'. For example, the parameter may contain the viewing direction in degrees between 0° and 360°. This may allow the streaming client to determine which subset of domes is to be retrieved from the streaming server.

Dome Boundaries

Figure 10:
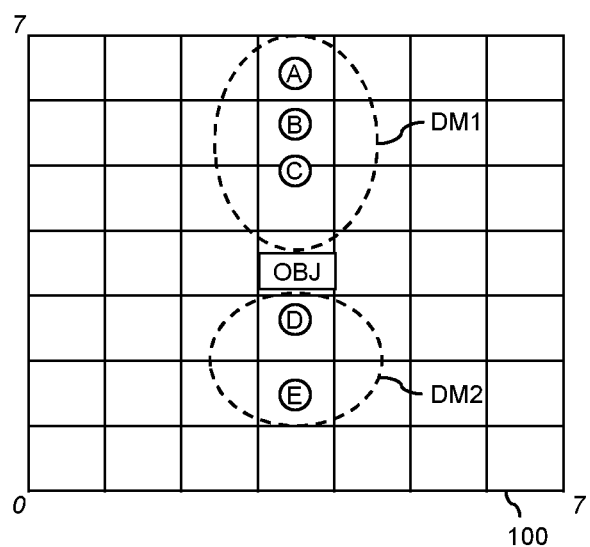
FIG. 10 illustrates dome boundaries being defined in a coordinate system associated with the scene to indicate to which viewpoints a dome applies.

Domes may be defined to apply to a certain set of viewpoints, with the term 'applying' referring to the fact that the video content of the dome may be used in the reconstruction of a respective viewpoint. If the viewpoints are representable as coordinates in a coordinate system associated with the scene, a dome may be defined as a boundary in the coordinate system, with the dome applying to all viewpoints within the boundary. FIG. 10 illustrates such dome boundaries for domes DM1, DM2 in a coordinate system associated with a scene 100. It can be seen that the dome DM1 is defined to apply to viewpoints A, B and C, while the dome DM2 is defined to apply to viewpoints D and E. It will be appreciated that each dome may also apply to intermediate viewpoints which for example may be generated by viewpoint synthesis techniques as referenced elsewhere in this specification. However, if viewpoint synthesis is used to generate viewpoints outside of dome boundaries, e.g., when transitioning between viewpoints C and D, it may not be apparent which dome to retrieve. As one possible solution, the streaming client may determine which dome to retrieve based on the dome's boundaries, for example to determine which dome is nearest. This may mean that in the FIG. 10 example, the streaming client may switch from dome DM1 to dome DM2 at approximately the location of the object OBJ.

It will be appreciated that in addition to viewpoints and domes, also objects may be defined in terms of their location in the coordinate system of the scene. This may enable a streaming client to adapt its streaming depending on the relative location of a viewpoint which is currently rendered, or is to be rendered, to an object in the scene. For example, based on the location of the object, the streaming client may retrieve a different version of shared video content showing the object, e.g., by retrieving a version which depicts the object in the highest spatial resolution. Accordingly, the MPD may be generated effectively provide a spatial map of the scene defining viewpoints, dome boundaries and/or objects. The spatial map may take the form of a grid. For example, an object may be defined in a manifest file as follows:

```
<grid>
    <object id="obj1" row="3" column="3" x="0.5" y="0.5"
    width="200" depth="200"
    height="200"></object>
</grid>
```

Here, x & y may be a fraction, where y=1.0 may be the top left corner of the object in the grid and y=0 may be the bottom left corner of the object in the grid. Width, depth and height may define a size of the object, which may for example be defined in meters, e.g., being 200×200×200 meters, or in any other suitable manner. At the authoring side, the location of the objects may be determined manually but also automatically, for example using a depth camera or using image-recognition techniques for 3D depth reconstruction to reconstruct the size and/or location of objects in the scene from the acquired omnidirectional video content of the scene. By having object coordinates available, the streaming client may determine which domes are most suitable for obtaining the video data of the dome, for example by comparing the coordinates of the object to the dome boundaries. This way, the streaming client may for example retrieve a dome which shows the object with the highest resolution, or a part of the dome showing the object, if such high-resolution rendering is desired.

Figure 11:
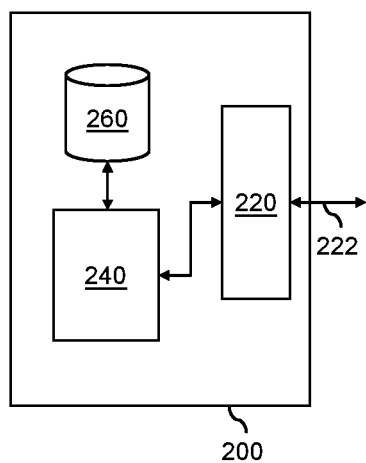
FIG. 11 shows a streaming server for streaming video data to a streaming client, wherein the video data represents a panoramic video of a scene.

FIG. 11 shows a streaming server 200 for streaming video data representing a panoramic video of a scene to a streaming client. The streaming server 200 may comprise a network interface 220 to a network. The streaming client may be reachable by data communication 222 via the network. The network interface 220 may for example be a wired communication interface, such as an Ethernet or fiber-optic based interface. The network may for example be the Internet or a mobile network, with the streaming server 200 being connected to a fixed part of the mobile network. Alternatively, the network interface 220 may be a wireless communication interface, e.g., being of a type as described below for the streaming client 300 of FIG. 12.

The streaming server 200 may further comprise a processor subsystem 240 which may be configured, e.g., by hardware design or software, to perform the operations described in this specification in as far as pertaining to a streaming server or in general to the streaming of video data of panoramic videos of a scene to a streaming client. In general, the processor subsystem 240 may be embodied by a single Central Processing Unit (CPU), such as a x86 or ARM-based CPU, but also by a combination or system of such CPUs and/or other types of processing units. In embodiments where the streaming server 200 is distributed over different entities, e.g., over different servers, the processor subsystem 240 may also be distributed, e.g., over the CPUs of such different servers. As also shown in FIG. 11, the streaming server 200 may comprise a data storage 260, such as a hard drive or an array of hard drives, a solid-state drive or an array of solid-state drives, etc., which may be used to store data.

In general, the streaming server 200 may be a content delivery node, or may be implemented in a distributed manner using a number of content delivery nodes. The streaming server 200 may also be implemented by another type of server or a system of such servers. For example, the streaming server 200 may be implemented by one or more cloud servers or by one or more edge nodes of a mobile network.

Figure 12:
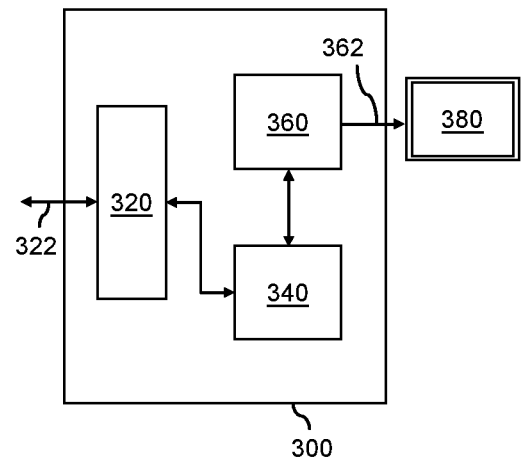
FIG. 12 shows a streaming client for receiving video data by streaming, wherein the video data represents a panoramic video of a scene.

FIG. 12 shows a streaming client 300 for receiving video data representing a panoramic video of a scene by streaming. The streaming client 300 may comprise a network interface 320 to a network so as to be able to communicate with a streaming server via data communication 322. The network interface 320 may for example be a wireless communication interface, which may also be referred to as a radio interface, and which may be configured to connect to a mobile network infrastructure. In some examples, the network interface 320 may comprise a radio and an antenna, or a radio and an antenna connection. In a specific example, the network interface 320 may be a 4G or 5G radio interface for connecting to a 4G or 5G mobile network adhering to one or more 3GPP standards, or a Wi-Fi communication interface for connecting to a Wi-Fi network infrastructure, etc. In other examples, the network interface 320 may be a wired communication interface, for example of a type as described for the streaming server 200 of FIG. 11. It is noted that the data communication between the streaming client 300 and the streaming server 200 may involve multiple networks. For example, the streaming client may be connected via a radio access network to a mobile network's infrastructure and via the mobile network's infrastructure to the Internet, with the streaming server being a server which is also connected to the Internet.

The streaming client 300 may further comprise a processor subsystem 340 which may be configured, e.g., by hardware design or software, to perform the operations described in this specification in as far as pertaining to a streaming client or in general to the receiving, by streaming, of video data of panoramic videos of a scene. In general, the processor subsystem 340 may be embodied by a single Central Processing Unit (CPU), such as a x86 or ARM-based CPU, but also by a combination or system of such CPUs and/or other types of processing units, such as Graphics Processing Units (GPUs). The streaming client 300 may further comprise a display output 360 for outputting display data 362 to a display 380. The display 380 may be an external display or an internal display of the streaming client 300 (FIG. 12 shows an external display), and in general may be head-mounted or non-head mounted. Using the display output 360, the streaming client 300 may display a received panoramic video. In some embodiments, this may involve the processor subsystem 340 rendering the panoramic video, with the term 'rendering' referring to one or more process steps by which the video data of the panoramic video may be converted into a displayable form. For example, the rendering may involve mapping the video data of the panoramic video as a texture onto an object in a virtual environment, such as the inside of a sphere. The rendered video data may then be provided to the display output 360.

In general, the streaming client 300 may be embodied by a (single) device or apparatus, e.g., a smartphone, personal computer, laptop, tablet device, gaming console, set-top box, television, monitor, projector, smart watch, smart glasses, media player, media recorder, etc. In some examples, the streaming client 300 may be a so-called User Equipment (UE) of a mobile telecommunication network, such as a 5G or next-gen mobile network. In other examples, the streaming client may be an edge node of a network, such as an edge node of the aforementioned mobile telecommunication. In such examples, the streaming client may lack a display output, or at least may not use the display output to display the received video data. Rather, the streaming client may receive the video data from a streaming server and reconstruct a panoramic video therefrom, which may then be made available for streaming, for example via tiled streaming, to a further downstream streaming client, such as an end-user device.

Figure 13:
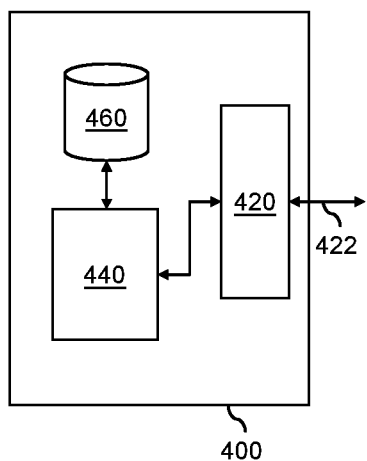
FIG. 13 shows an authoring system for authoring one or more video streams representing a panoramic video of a scene.

FIG. 13 shows an authoring system 400 for authoring one or more video streams representing a panoramic video of a scene. The authoring system 400 may comprise a data storage 460, such as a hard drive or an array of hard drives, a solid-state drive or an array of solid-state drives, etc., which may store a plurality of panoramic videos from respective viewpoints of a scene. The authoring system 400 is further shown to comprise a network interface 420 for data communication via a network 422. The network interface 420 may be of a type as described for the streaming server 200 of FIG. 11 or the streaming client 300 of FIG. 12. In some examples, the data storage 460 may be an external storage which may be network accessible via the network interface 420. The authoring system 400 may further comprise a processor subsystem 440 which may be configured, e.g., by hardware design or software, to perform the operations described in this specification in as far as pertaining to the authoring system or in general to the authoring of video streams, which may include the generating of shared video streams (domes), metadata, etc.

For example, the processor subsystem 440 may be configured to identify shared video data representing shared video content of the scene, wherein the shared video content comprises video content of the scene which is visible in a first panoramic video and in a second panoramic video. As elucidated elsewhere, such shared video content may for example be identified by finding correspondences between video frames. The processor subsystem 440 may be further configured to identify first viewpoint-specific video data which represents first viewpoint-specific video content of the scene, wherein the first viewpoint-specific video content comprises video content of the scene which is part of the first panoramic video and not part of the shared video content of the scene. The processor subsystem 440 may be further configured to encode the first panoramic video by encoding the first viewpoint-specific video data as a first viewpoint-specific video stream and by encoding the shared video data as a shared video stream, or by encoding the first viewpoint-specific video data and the shared video data as a video stream, wherein the shared video data is included in the video stream as an independently decodable part of the video stream.

The processor subsystem 440 may in general be of a type as described for the streaming server 200 of FIG. 11 or for the streaming client 300 of FIG. 12. In general, the authoring system 400 may be embodied by a (single) device or apparatus, e.g., personal computer, laptop, workstation, etc. In some examples, the authoring system 400 may be distributed over various entities, such as local or remote servers.

In general, each entity described in this specification may be embodied as, or in, a device or apparatus. The device or apparatus may comprise one or more (micro)processors which execute appropriate software. The processor(s) of a respective entity may be embodied by one or more of these (micro)processors. Software implementing the functionality of a respective entity may have been downloaded and/or stored in a corresponding memory or memories, e.g., in volatile memory such as RAM or in non-volatile memory such as Flash. Alternatively, the processor(s) of a respective entity may be implemented in the device or apparatus in the form of programmable logic, e.g., as a Field-Programmable Gate Array (FPGA). Any input and/or output interfaces may be implemented by respective interfaces of the device or apparatus. In general, each functional unit of a respective entity may be implemented in the form of a circuit or circuitry. A respective entity may also be implemented in a distributed manner, e.g., involving different devices or apparatus.

Figure 14:
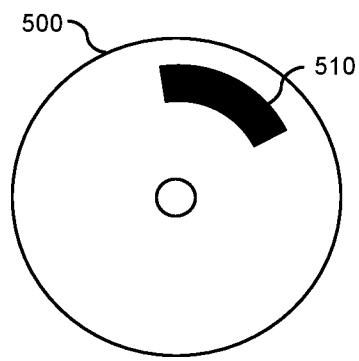
FIG. 14 shows a computer-readable medium comprising non-transitory data.

It is noted that any of the methods described in this specification, for example in any of the claims, may be implemented on a computer as a computer implemented method, as dedicated hardware, or as a combination of both. Instructions for the computer, e.g., executable code, may be stored on a computer-readable medium 500 as for example shown in FIG. 14, e.g., in the form of a series 510 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, servers, online software, etc. FIG. 14 shows by way of example an optical storage device 500.

In an alternative embodiment of the computer-readable medium 500, the computer-readable medium 500 may comprise transitory or non-transitory data 510 in the form of a data structure representing metadata described in this specification.

Figure 15:
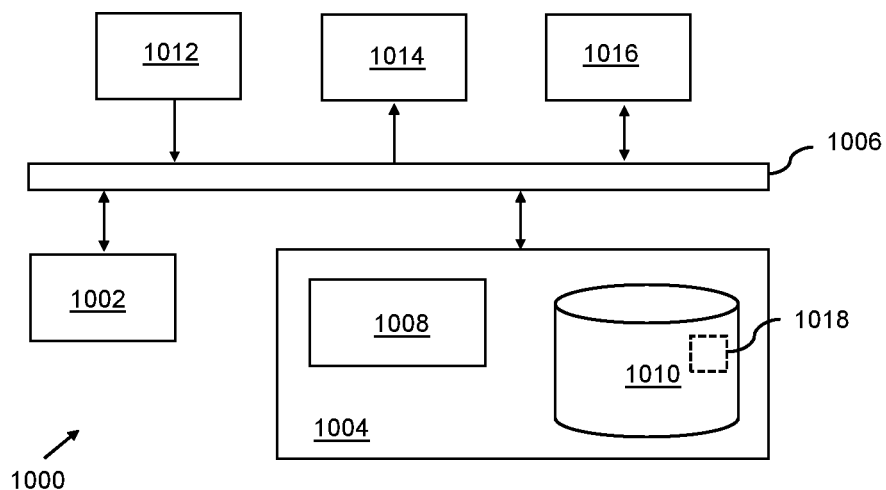
FIG. 15 shows an exemplary data processing system.

FIG. 15 is a block diagram illustrating an exemplary data processing system 1000 that may be used in the embodiments described in this specification. Such data processing systems include data processing entities described in this specification, including but not limited to the streaming server, streaming client and authoring system.

The data processing system 1000 may include at least one processor 1002 coupled to memory elements 1004 through a system bus 1006. As such, the data processing system may store program code within memory elements 1004. Furthermore, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

The memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The data processing system 1000 may also include one or more cache memories (not shown) that provide temporary storage of at least some program code in order to reduce the number of times program code is otherwise retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 15, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

For example, data processing system 1000 may represent a streaming server as described with reference to FIG. 11 and elsewhere in this specification. In that case, application 1018 may represent an application that, when executed, configures data processing system 1000 to perform the functions described with reference to said entity. In another example, data processing system 1000 may represent a streaming client as described with reference to FIG. 12 and elsewhere in this specification. In that case, application 1018 may represent an application that, when executed, configures data processing system 1000 to perform the functions described with reference to said entity. In another example, data processing system 1000 may represent an authoring system as described with reference to FIG. 13 and elsewhere in this specification. In that case, application 1018 may represent an application that, when executed, configures data processing system 1000 to perform the functions described with reference to said entity.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of streaming video data to a streaming client, wherein the video data represents a panoramic video of a scene, wherein the panoramic video shows the scene from a viewpoint within the scene, wherein the viewpoint is one of a plurality of viewpoints within the scene, the method comprising, by a streaming server:
streaming first video data representing a first panoramic video from a first viewpoint within the scene to the streaming client;
in response to a decision to stream second video data representing a second panoramic video from a second viewpoint within the scene, streaming the second video data to the streaming client by, in at least one operational mode of the streaming server, at least temporarily and simultaneously:
continuing to stream at least part of the first video data by continuing to stream shared video data which represents shared video content of the scene, wherein the shared video content comprises video content of the scene which is visible in the first panoramic video and in the second panoramic video; and
streaming second viewpoint-specific video data which represents second viewpoint-specific video content of the scene, wherein the second viewpoint-specific video content comprises video content of the scene which is part of the second panoramic video and not part of the shared video content of the scene.

2. The method according to claim 1, wherein:
the streaming of the first video data comprises streaming first viewpoint-specific video data which represents first viewpoint-specific video content of the scene, wherein the first viewpoint-specific video content comprises video content of the scene which is part of the first panoramic video and not part of the shared video content of the scene, and streaming a shared video stream comprising the shared video data;
the streaming of the second video data comprises at least temporarily continuing to stream the shared video stream.

3. The method according to claim 1, wherein the streaming of the first video data comprises streaming a video stream in which the shared video data is included as an independently decodable part.

4. The method according to claim 1, further comprising providing metadata to the streaming client, wherein the metadata is indicative of the shared video data representing part of the first video data and part of the second video data.

5. The method according to claim 1, further comprising streaming the shared video data or any viewpoint-specific video data as a spatially segmented encoding of at least part of a panoramic video.

6. The method according to claim 1, wherein the streaming of the shared video data comprises periodically transmitting at least one of:
an image; and
metadata defining a color for filling a spatial region,
wherein the image or the color represent at least part of the shared video content for at least a plurality of video frames.

7. A computer-implemented method of receiving video data, wherein the video data represents a panoramic video of a scene, wherein the panoramic video shows the scene from a viewpoint within the scene, wherein the viewpoint is one of a plurality of viewpoints within the scene,
the method comprising, by a streaming client:
receiving, by streaming, first video data representing a first panoramic video from a first viewpoint within the scene;
when switching to a second viewpoint,
receiving, by streaming, second video data of a second panoramic video from the second viewpoint within the scene;
wherein the receiving, by streaming, of the second video data comprises, in at least one operational mode of the streaming client, at least temporarily and simultaneously:
continuing to receive, by streaming, at least part of the first video data by continuing to receive shared video data which represents shared video content of the scene, wherein the shared video content comprises video content of the scene which is visible in the first panoramic video and in the second panoramic video,
receiving, by streaming, second viewpoint-specific video data which represents second viewpoint-specific video content of the scene, wherein the second viewpoint-specific video content comprises video content of the scene which is part of the second panoramic video and not part of the shared video content of the scene.

8. The method according to claim 7, further comprising:
receiving metadata, wherein the metadata is indicative of the shared video data representing part of the first video data and part of the second video data; and
on the basis of the metadata, using the shared video data for the rendering of the second panoramic video.

9. The method according to claim 8, wherein the metadata further identifies a second viewpoint-specific video stream containing the second viewpoint-specific video data, wherein the second viewpoint-specific video stream is accessible from a streaming server, and wherein the method further comprises, on the basis of the metadata and when switching to the second viewpoint, requesting the second viewpoint-specific video stream from the streaming server.

10. The method according to claim 8, wherein the metadata is a manifest for the streaming of the video data of the scene.

11. The method according to claim 8, wherein the metadata is indicative of a transformation to be applied to the shared video content, and wherein the method further comprises applying the transformation to the shared video content before or as part of the rendering of the second panoramic video.

12. The method according to claim 8, wherein locations of the viewpoints are representable as respective coordinates in a coordinate system associated with the scene, wherein the metadata defines a range of coordinates for the shared video data, and wherein the method further comprises using the shared video data for the rendering of respective panoramic videos of viewpoints of which the respective coordinates lie in the range of coordinates defined by the metadata.

13. The method according to claim 7, wherein the shared video data which is at least temporarily received is a first version of the shared video content which is derived from the first panoramic video, wherein the method further comprises receiving, by streaming, second shared video data which represents a second version of the shared video content which is derived from the second panoramic video.

14. The method according to claim 13, wherein the second version of the shared video content is received as a video stream, and wherein the receiving of the video stream starts at a stream access point in the video stream.

15. The method according to claim 14, wherein the video stream containing the second version of the shared video content is a second shared video stream, wherein the second viewpoint-specific video data is received as a second viewpoint-specific video stream, and wherein the second shared video stream comprises, per time unit, fewer stream access points than the second viewpoint-specific video stream.

16. The method according to claim 7, further comprising combining the shared video content with the second viewpoint-specific video content by at least one of:
spatially adjoining the shared video content with the second viewpoint-specific video content;
merging the shared video content with the second viewpoint-specific video content; and overlaying the second viewpoint-specific video content over the shared video content.

17. The method according to claim 7, further comprising: rendering the second video data to obtain rendered video data for display by the streaming client or another entity, wherein the rendering comprises combining the shared video data and the second viewpoint-specific video data.

18. A computer-implemented method of authoring one or more video streams representing a panoramic video of a scene, the method comprising:
accessing a first panoramic video, wherein the first panoramic video shows the scene from a first viewpoint within the scene;
accessing a second panoramic video, wherein the second panoramic video shows the scene from a second viewpoint within the scene;
identifying shared video data representing shared video content of the scene, wherein the shared video content comprises video content of the scene which is visible in the first panoramic video and in the second panoramic video;
identifying first viewpoint-specific video data which represents first viewpoint-specific video content of the scene, wherein the first viewpoint-specific video content comprises video content of the scene which is part of the first panoramic video and not part of the shared video content of the scene; and
encoding the first panoramic video by:
encoding the first viewpoint-specific video data as a first viewpoint-specific video stream and encoding the shared video data as a shared video stream; or
encoding the first viewpoint-specific video data and the shared video data as a video stream, wherein the shared video data is included in the video stream as an independently decodable part of the video stream.

19. A computer-readable medium comprising non-transitory data representing a computer program, the computer program comprising instructions for causing a processor system to perform the method according to claim 1.

20. A computer-readable medium comprising non-transitory data, the data defining a data structure, the data structure representing metadata which identifies video data of a video stream as representing shared video content of a scene, wherein the metadata is indicative of the shared video content being visible in at least a first panoramic video and a second panoramic video of the scene.

21. A streaming server for streaming video data to a streaming client, wherein the video data represents a panoramic video of a scene, wherein the panoramic video shows the scene from a viewpoint within the scene, wherein the viewpoint is one of a plurality of viewpoints within the scene,
wherein the streaming server comprises:
a network interface to a network, wherein the streaming client is reachable by data communication via the network;
a processor subsystem configured to, via the network interface:
stream first video data representing a first panoramic video from a first viewpoint within the scene to the streaming client;
in response to a decision to stream second video data representing a second panoramic video from a second viewpoint within the scene, stream the second video data to the streaming client by at least temporarily and simultaneously:
continuing to stream at least part of the first video data by continuing to stream shared video data which represents shared video content of the scene, wherein the shared video content comprises video content of the scene which is visible in the first panoramic video and in the second panoramic video; and
streaming second viewpoint-specific video data which represents second viewpoint-specific video content of the scene, wherein the second viewpoint-specific video content comprises video content of the scene which is part of the second panoramic video and not part of the shared video content of the scene.

22. A streaming client for receiving video data by streaming, wherein the video data represents a panoramic video of a scene, wherein the panoramic video shows the scene from a viewpoint within the scene, wherein the viewpoint is one of a plurality of viewpoints within the scene,
wherein the streaming client comprises:
a network interface to a network;
a processor subsystem configured to, via the network interface:
receive, by streaming, first video data representing a first panoramic video from a first viewpoint within the scene;
when switching to a second viewpoint, receive, by streaming, second video data of a second panoramic video from the second viewpoint within the scene, wherein the receiving, by streaming, of the second video data comprises at least temporarily and simultaneously:
continuing to receive, by streaming, at least part of the first video data by continuing to receive shared video data which represents shared video content of the scene, wherein the shared video content comprises video content of the scene which is visible in the first panoramic video and in the second panoramic video,
receiving, by streaming, second viewpoint-specific video data which represents second viewpoint-specific video content of the scene, wherein the second viewpoint-specific video content comprises video content of the scene which is part of the second panoramic video and not part of the shared video content of the scene.

23. The streaming client according to claim 22, wherein the streaming client is one of:
a network node, such as an edge node;
an end-user device configured to connect to the network.

24. An authoring system for authoring one or more video streams representing a panoramic video of a scene, the authoring system comprising:
a data storage interface for:
accessing a first panoramic video, wherein the first panoramic video shows the scene from a first viewpoint within the scene;
accessing a second panoramic video, wherein the second panoramic video shows the scene from a second viewpoint within the scene;
a processor subsystem configured to:
identify shared video data representing shared video content of the scene, wherein the shared video content comprises video content of the scene which is visible in the first panoramic video and in the second panoramic video;
identify first viewpoint-specific video data which represents first viewpoint-specific video content of the scene, wherein the first viewpoint-specific video content comprises video content of the scene which is part of the first panoramic video and not part of the shared video content of the scene; and encode the first panoramic video by:

encoding the first viewpoint-specific video data as a first viewpoint-specific video stream and encoding the shared video data as a shared video stream; or encoding the first viewpoint-specific video data and the shared video data as a video stream, wherein the shared video data is included in the video stream as an independently decodable part of the video stream.

* * * * *